(12) United States Patent
Bisaiji et al.

(10) Patent No.: US 8,701,392 B2
(45) Date of Patent: Apr. 22, 2014

(54) EXHAUST PURIFICATION SYSTEM OF INTERNAL COMBUSTION ENGINE

(75) Inventors: Yuki Bisaiji, Mishima (JP); Kohei Yoshida, Gotemba (JP); Mikio Inoue, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 80 days.

(21) Appl. No.: 13/520,869

(22) PCT Filed: Jan. 30, 2012

(86) PCT No.: PCT/JP2012/051981
§ 371 (c)(1),
(2), (4) Date: Jul. 6, 2012

(87) PCT Pub. No.: WO2013/114533
PCT Pub. Date: Aug. 8, 2013

(65) Prior Publication Data
US 2013/0192224 A1    Aug. 1, 2013

(51) Int. Cl.
*F01N 3/00* (2006.01)
*F01N 3/02* (2006.01)
*F01N 3/20* (2006.01)

(52) U.S. Cl.
USPC .................. 60/295; 60/286; 60/299; 60/301

(58) Field of Classification Search
USPC .................... 60/286, 295, 299, 301
See application file for complete search history.

(56) References Cited

U.S. PATENT DOCUMENTS

2011/0113754 A1* 5/2011 Kohara et al. ............... 60/274
2011/0120100 A1* 5/2011 Yin et al. .................... 60/295
2011/0131952 A1* 6/2011 Onodera et al. ............. 60/274
2011/0173950 A1* 7/2011 Wan et al. ................... 60/274
2011/0209459 A1* 9/2011 Hancu et al. ................ 60/274
2012/0122660 A1* 5/2012 Andersen et al. ............ 502/65
2012/0124967 A1* 5/2012 Yang et al. .................. 60/274

FOREIGN PATENT DOCUMENTS

| JP | A-2008-175100 | 7/2008 |
| JP | A-2008-208720 | 9/2008 |
| WO | WO 2011/114499 A1 | 9/2011 |

OTHER PUBLICATIONS

Written Opinion of the International Searching Authority issued in International Application No. PCT/JP2012/051981 dated Mar. 6, 2012.
International Search Report issued in International Application No. PCT/JP2012/051981 dated Mar. 6, 2012.

* cited by examiner

*Primary Examiner* — Thomas E. Denion
*Assistant Examiner* — Dapinder Singh
(74) *Attorney, Agent, or Firm* — Oliff PLC

(57) ABSTRACT

An internal combustion engine wherein an exhaust purification catalyst and a hydrocarbon feed valve are arranged downstream in an exhaust passage. A first NOX purification method, which removes NOX by making a concentration of hydrocarbons that flows into the exhaust purification catalyst vibrate within predetermined amplitude and period ranges and a second NOX purification method which utilizes an adsorption action of NOX to the exhaust purification catalyst are used. A high pressure exhaust gas recirculation system (HPL) causing recirculation of high pressure exhaust gas and a low pressure exhaust gas recirculation system (LPL) causing recirculation of low pressure exhaust gas are provided. When performing an LPL recirculation while performing an NOX purification action by the second NOX purification method, if an acceleration operation occurs, the NOX purification action is switched to the NOX purification action by the first NOX purification method and recirculation is temporarily switched to the HPL recirculation.

6 Claims, 20 Drawing Sheets

EXHAUST PURIFICATION SYSTEM OF INTERNAL COMBUSTION ENGINE

TECHNICAL FIELD

The present invention relates to an exhaust purification system of an internal combustion engine.

BACKGROUND ART

Known in the art is an internal combustion engine which is provided with an exhaust turbocharger which has a compressor and an exhaust turbine, which is provided with an exhaust gas recirculation system which recirculates exhaust gas which is exhausted upstream of the exhaust turbine in an engine exhaust passage to downstream of the compressor in an intake passage, which arranges an exhaust purification catalyst downstream of the exhaust turbine in the engine exhaust passage, which arranges a hydrocarbon feed valve upstream of the exhaust purification catalyst in the engine exhaust passage, which carries precious metal catalysts on exhaust gas flow surfaces of the exhaust purification catalyst and is formed with basic exhaust gas flow surface parts around the precious metal catalysts, which injects hydrocarbons from a hydrocarbon feed valve by a predetermined period at the time of engine operation, and thereby removes the $NO_X$ which is contained in the exhaust gas (for example, see Patent Literature 1). In this internal combustion engine, even if the temperature of the exhaust purification catalyst becomes a high temperature, a high $NO_X$ purification rate can be obtained.

CITATIONS LIST

Patent Literature

Patent Literature 1: WO2011/114499A1

SUMMARY OF INVENTION

Technical Problem

However, in this internal combustion engine, there is the problem that the amount of hydrocarbons which are used for removing the $NO_X$ continues to be too great.

An object of the present invention is to provide an exhaust purification system of an internal combustion engine which reduces the amount of consumption of hydrocarbons for removal of $NO_X$ while enables a high $NO_X$ purification rate to be obtained.

Solution to Problem

According to the present invention, there is provided an exhaust purification system of an internal combustion engine comprising an exhaust turbocharger which has a compressor and an exhaust turbine, an exhaust purification catalyst is arranged in an engine exhaust passage downstream of the exhaust turbine, a hydrocarbon feed valve is arranged in the engine exhaust passage upstream of the exhaust purification catalyst, precious metal catalysts are carried on exhaust gas flow surfaces of the exhaust purification catalyst, basic exhaust gas flow surface parts are formed around the precious metal catalysts, the exhaust purification catalyst has a property of reducing $NO_X$ contained in an exhaust gas if making a concentration of hydrocarbons which flow into the exhaust purification catalyst vibrate by within a predetermined range of amplitude and by within a predetermined range of period and has a property of being increased in storage amount of $NO_X$ which is contained in the exhaust gas if making a vibration period of the hydrocarbon concentration longer than the predetermined range, a first $NO_X$ purification method which makes the concentration of hydrocarbons which flow into the exhaust purification catalyst vibrate by within the predetermined ranges of amplitude and period so as to remove the $NO_X$ and a second $NO_X$ purification method which makes the vibration period of the hydrocarbon concentration longer than the predetermined range so as to store the $NO_X$ in the exhaust purification catalyst and makes an air-fuel ratio of the exhaust gas rich so as to release the stored $NO_X$ can be selectively used, wherein a high pressure exhaust gas recirculation system which recirculates a relatively high pressure exhaust gas in the engine exhaust passage upstream of the exhaust turbine to an inside of the intake passage downstream of the compressor and a low pressure exhaust gas recirculation system which recirculates a relatively low pressure exhaust gas in the engine exhaust passage downstream of the exhaust purification catalyst to an inside of the intake passage upstream of the compressor are provided, and wherein if an acceleration operation is performed with a degree of acceleration of a predetermined degree or more when an $NO_X$ purification action by the second $NO_X$ purification method is being performed while performing an exhaust gas recirculation action by the low pressure exhaust gas recirculation system, the $NO_X$ purification action is switched to the $NO_X$ purification action by the first $NO_X$ purification method and the exhaust gas recirculation action is temporarily switched to the exhaust gas recirculation action by the high pressure exhaust gas recirculation system.

Advantageous Effects of Invention

It is possible to reduce the amount of consumption of hydrocarbons for removal of $NO_X$ while obtaining a high $NO_X$ purification rate.

BRIEF DESCRIPTION OF DRAWINGS

FIG. 1 is an overall view of a compression ignition type internal combustion engine.

FIG. 2 is a view which schematically shows the surface part of a catalyst carrier.

FIG. 3 is a view for explaining an oxidation reaction at an exhaust purification catalyst.

FIG. 4 is a view which shows changes in an air-fuel ratio of exhaust gas which flows into an exhaust purification catalyst.

FIG. 5 is a view which shows an $NO_X$ purification rate.

[FIG. 6]

[FIG. 7]

FIG. 8 is a view which shows changes in an air-fuel ratio of exhaust gas which flows into an exhaust purification catalyst.

FIG. 9 is a view which shows an $NO_X$ purification rate.

FIG. 10 is a time chart which shows changes in an air-fuel ratio of exhaust gas which flows into an exhaust purification catalyst.

[FIG. 1]

FIG. 12 is a view which shows a relationship between an oxidizing power of an exhaust purification catalyst and a demanded minimum air-fuel ratio X.

FIG. 13 is a view which shows a relationship between a concentration of oxygen in exhaust gas and an amplitude ΔH of hydrocarbon concentration which gives the same $NO_X$ purification rate.

FIG. 14 is a view which shows a relationship between an amplitude ΔH of hydrocarbon concentration and an $NO_X$ purification rate.

FIG. 15 is a view which shows a relationship between a vibration period ΔT of hydrocarbon concentration and an $NO_X$ purification rate.

[FIG. 16]

[FIG. 17]

FIG. 18 is a view which shows $NO_X$ release control.

FIG. 19 is a view which shows a map of an exhausted $NO_X$ amount NOXA.

FIG. 20 is a view which shows a fuel injection timing.

FIG. 21 is a view which shows a map of a hydrocarbon feed amount WR.

FIG. 22 is a view which shows operating regions I, II, and III.

FIG. 23 is a time chart for explaining an exhaust gas recirculation method and an $NO_X$ purification method at the time of an acceleration operation.

FIG. 24 is a time chart for explaining an exhaust gas recirculation method and an $NO_X$ purification method at the time of an acceleration operation.

FIG. 25 is a view which shows a relationship between a degree of acceleration and a time th.

FIG. 26 is a view which shows a first $NO_X$ purification method and a second $NO_X$ purification method.

FIG. 27 is a flow chart for $NO_X$ purification control.

FIG. 28 is a flow chart for $NO_X$ purification control.

DESCRIPTION OF EMBODIMENTS

Figure 1:
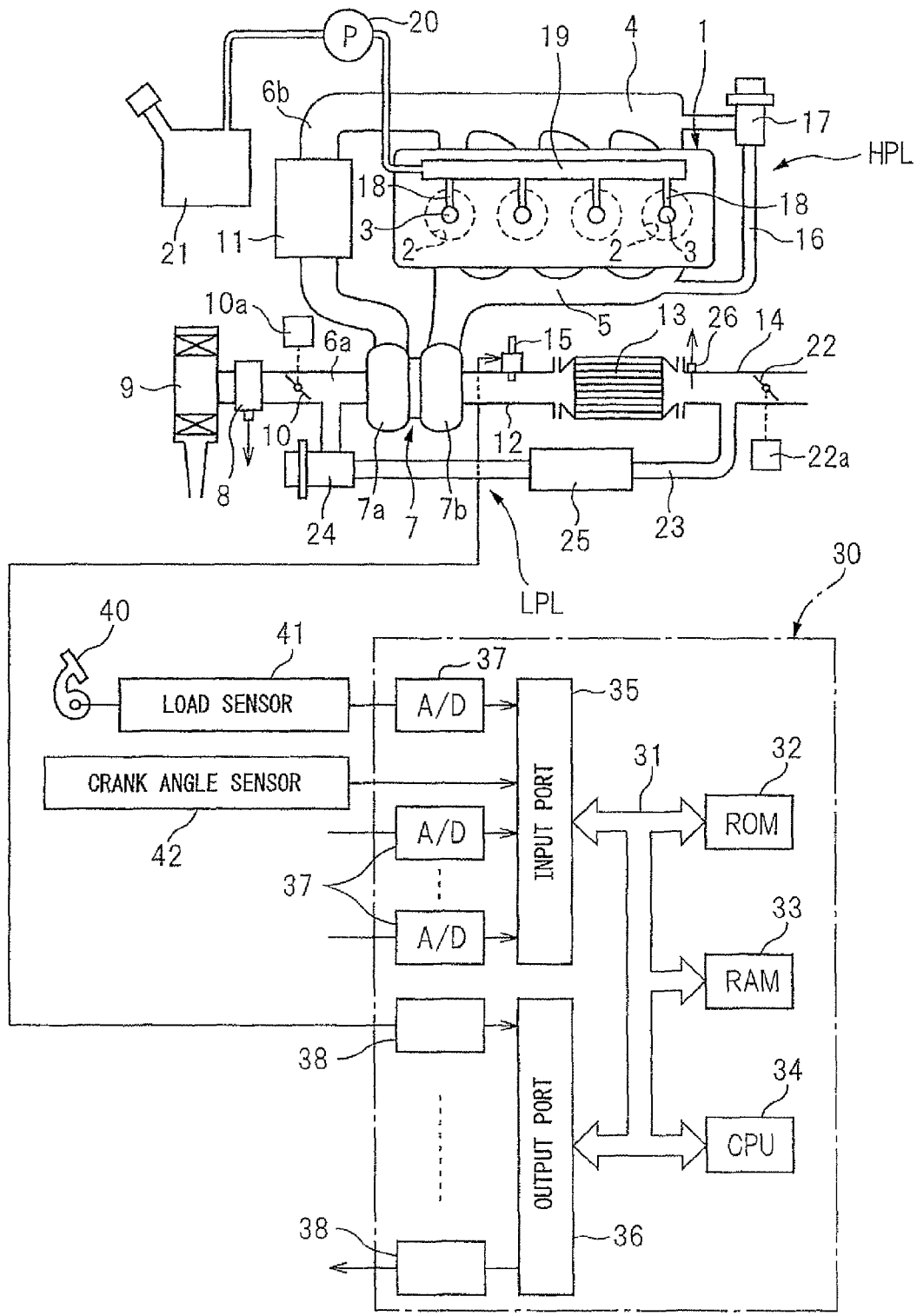
[FIG. 1]

FIG. 1 is an overall view of a compression ignition type internal combustion engine.

Referring to FIG. 1, 1 indicates an engine body, 2 a combustion chamber of each cylinder, 3 an electronically controlled fuel injector for injecting fuel into each combustion chamber 2, 4 an intake manifold, and 5 an exhaust manifold. The intake manifold 4 is connected through an intake duct 6b to an outlet of a compressor 7a of an exhaust turbocharger 7, while an inlet of the compressor 7a is connected through an intake duct 6a and an intake air detector 8 to an air cleaner 9. Inside the intake duct 6a, a throttle valve 10 which is driven by an actuator 10a is arranged. Around the intake duct 6b, a cooling device 11 is arranged for cooling the intake air which flows through the inside of the intake duct 6b. In the embodiment which is shown in FIG. 1, the engine cooling water is guided to the inside of the cooling device 11 where the engine cooling water is used to cool the intake air.

On the other hand, the exhaust manifold 5 is connected to an inlet of an exhaust turbine 7b of the exhaust turbocharger 7. An outlet of the exhaust turbine 7b is connected through an exhaust pipe 12 to an inlet of the exhaust purification catalyst 13, while an outlet of the exhaust purification catalyst 13 is connected through an exhaust pipe 14. Upstream of the exhaust purification catalyst 13 inside the exhaust pipe 12, a hydrocarbon feed valve 15 is arranged for feeding hydrocarbons comprised of diesel oil or other fuel used as fuel for a compression ignition type internal combustion engine. In the embodiment shown in FIG. 1, diesel oil is used as the hydrocarbons which are fed from the hydrocarbon feed valve 15. Note that, the present invention can also be applied to a spark ignition type internal combustion engine in which fuel is burned under a lean air-fuel ratio. In this case, from the hydrocarbon feed valve 15, hydrocarbons comprised of gasoline or other fuel used as fuel of a spark ignition type internal combustion engine are fed.

On the other hand, the exhaust manifold 5 and the intake manifold 4 are connected with each other through an exhaust gas recirculation (hereinafter referred to as an "EGR") passage 16. Inside the EGR passage 16, an electronically controlled EGR control valve 17 is arranged. Further, each fuel injector 3 is connected through a fuel feed tube 18 to a common rail 19. This common rail 19 is connected through an electronically controlled variable discharge fuel pump 20 to a fuel tank 21. The fuel which is stored inside of the fuel tank 21 is fed by the fuel pump 20 to the inside of the common rail 19. The fuel which is fed to the inside of the common rail 19 is fed through each fuel feed tube 18 to the fuel injector 3.

On the other hand, downstream of the exhaust purification catalyst 13 inside of the exhaust pipe 14, an exhaust control valve 22 which is driven by an actuator 22a is arranged. The inside of the exhaust pipe 14 between this exhaust control valve 22 and exhaust purification catalyst 13 is connected through an EGR passage 23 to the intake pipe 6a. Inside this EGR passage 23, an electronic control type EGR control valve 24 is arranged. Further, around the EGR passage 23, a cooling device 25 is arranged for cooling the exhaust gas which flows through the inside of the EGR passage 23. In the embodiment which is shown in FIG. 1, the engine cooling water is guided to the inside of the cooling device 25 where the engine cooling water is used to cool the exhaust gas.

An electronic control unit 30 is comprised of a digital computer provided with a ROM (read only memory) 32, a RAM (random access memory) 33, a CPU (microprocessor) 34, an input port 35, and an output port 36, which are connected with each other by a bidirectional bus 31. Downstream of the exhaust purification catalyst 13, a temperature sensor 26 is arranged for detecting the temperature of the exhaust purification catalyst 13. The output signals of these temperature sensor 26 and intake air detector 8 are input through respectively corresponding AD converters 37 to the input port 35. Further, the accelerator pedal 40 has a load sensor 41 connected to it which generates an output voltage proportional to the amount of depression L of the accelerator pedal 40. The output voltage of the load sensor 41 is input through a corresponding AD converter 37 to the input port 35. Furthermore, at the input port 35, a crank angle sensor 42 is connected which generates an output pulse every time a crankshaft rotates by, for example, 15°. On the other hand, the output port 36 is connected through corresponding drive circuits 38 to each fuel injector 3, actuator 10a for driving the throttle valve, hydrocarbon feed valve 15, EGR control valve 17, fuel pump 20, and actuator 22a for driving the exhaust control valve.

As explained above, in the embodiment which is shown in FIG. 1, an exhaust gas recirculation system HPL which is comprised of the EGR passage 16 and EGR control valve 17 and an exhaust gas recirculation system LPL which is comprised of the EGR passage 23 and EGR control valve 24, that is, two exhaust gas recirculation systems, are provided. In this case, as will be understood from FIG. 1, in the exhaust gas recirculation system HPL, the exhaust gas in the exhaust manifold 5 is recirculated, while in the exhaust gas recirculation system LPL, the exhaust gas downstream of the exhaust purification catalyst 13 in the exhaust pipe 14 is recirculated. In this regard, in this case, the pressure of the exhaust gas in the exhaust manifold 5 is considerably higher than the pressure of the exhaust gas downstream of the exhaust purification catalyst 13 in the exhaust pipe 14. Therefore, the exhaust gas recirculation system HPL will hereinafter be called the "high pressure exhaust gas recirculation system" for recirculating the relatively high pressure exhaust gas in the engine exhaust passage upstream of the exhaust turbine 7b to the inside of the intake passage downstream of the compressor 7a, while the exhaust gas recirculation system LPL will hereinafter be called the "low pressure exhaust gas recirculation system" for recirculating the relatively low pressure exhaust gas in the engine exhaust passage downstream of the exhaust purification catalyst 13 to the inside of the intake passage upstream of the compressor 7a.

Figure 2:
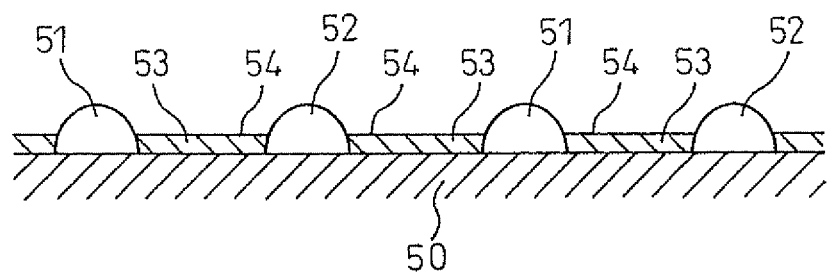
[FIG. 2]

FIG. 2 schematically shows a surface part of a catalyst carrier which is carried on a substrate of the exhaust purification catalyst 13. At this exhaust purification catalyst 13, as shown in FIG. 2, for example, there is provided a catalyst carrier 50 made of alumina on which precious metal catalysts 51 and 52 are carried. Furthermore, on this catalyst carrier 50, a basic layer 53 is formed which includes at least one element selected from potassium K, sodium Na, cesium Cs, or another such alkali metal, barium Ba, calcium Ca, or another such alkali earth metal, a lanthanide or another such rare earth and silver Ag, copper Cu, iron Fe, iridium Ir, or another metal able to donate electrons to $NO_X$. The exhaust gas flows along the top of the catalyst carrier 50, so the precious metal catalysts 51 and 52 can be said to be carried on the exhaust gas flow surface of the exhaust purification catalyst 13. Further, the surface of the basic layer 53 exhibits basicity, so the surface of the basic layer 53 is called the "basic exhaust gas flow surface parts 54".

On the other hand, in FIG. 2, the precious metal catalyst 51 is comprised of platinum Pt, while the precious metal catalyst 52 is comprised of rhodium Rh. Note that, in this case, both the precious metal catalysts 51 and 52 may be comprised from platinum Pt. Further, on the catalyst carrier 50 of the exhaust purification catalyst 13, in addition to platinum Pt and rhodium Rh, palladium Pd may be further carried or, instead of rhodium Rh, palladium Pd may be carried. That is, the precious metal catalysts 51 and 52 which are carried on the catalyst carrier 50 are comprised of at least one of platinum Pt, rhodium Rh and palladium Pd.

Figure 3:
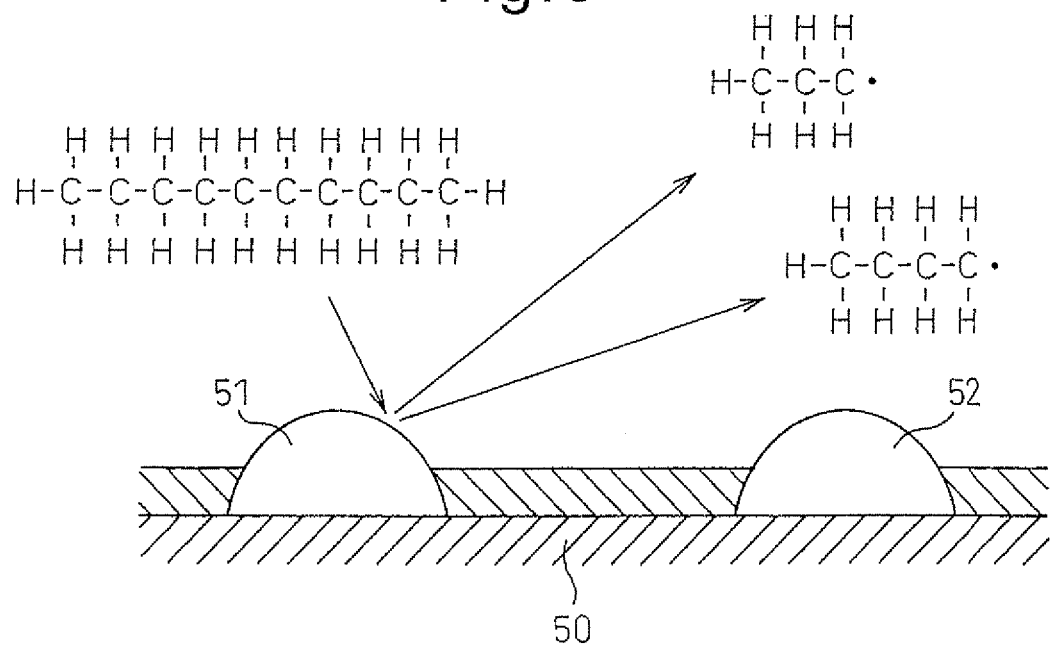
[FIG. 3]

If hydrocarbons are injected from the hydrocarbon feed valve 15 into the exhaust gas, the hydrocarbons are reformed by the exhaust purification catalyst 13. In the present invention, at this time, the reformed hydrocarbons are used to remove the $NO_X$ at the exhaust purification catalyst 13. FIG. 3 schematically shows the reformation action performed at the exhaust purification catalyst 13 at this time. As shown in FIG. 3, the hydrocarbons HC which are injected from the hydrocarbon feed valve 15 become radical hydrocarbons HC with a small carbon number due to the catalyst 51.

Figure 4:
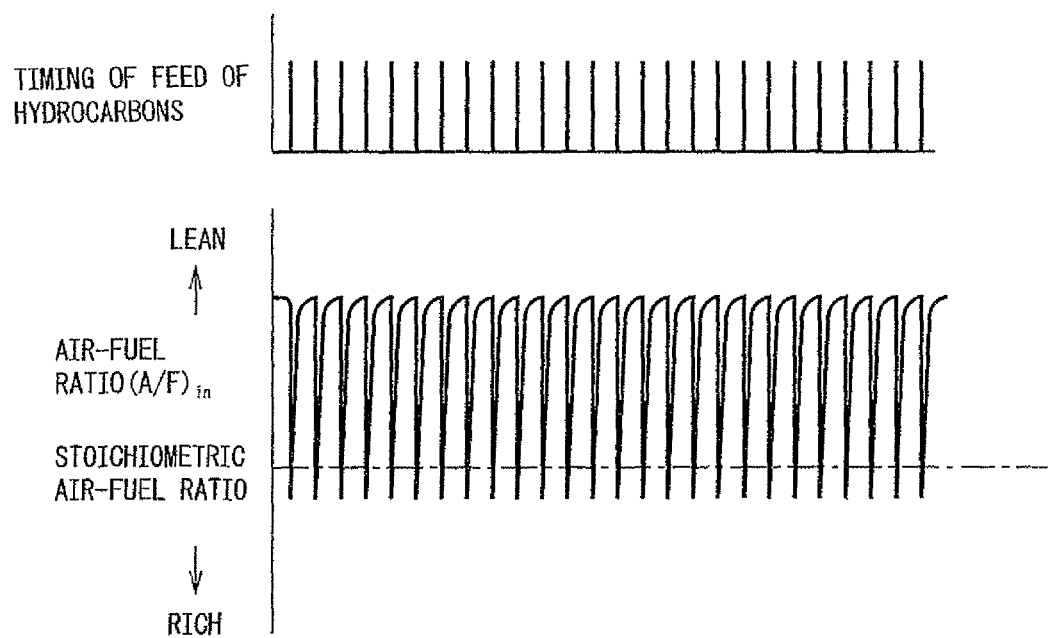
[FIG. 4]

FIG. 4 shows the feed timing of hydrocarbons from the hydrocarbon feed valve 15 and the change in the air-fuel ratio (A/F)in of the exhaust gas which flows into the exhaust purification catalyst 13. Note that, the changes in the air-fuel ratio (A/F)in depend on the change in concentration of the hydrocarbons in the exhaust gas which flows into the exhaust purification catalyst 13, so it can be said that the change in the air-fuel ratio (A/F)in shown in FIG. 4 expresses the change in concentration of the hydrocarbons. However, if the hydrocarbon concentration becomes higher, the air-fuel ratio (A/F)in becomes smaller, so, in FIG. 4, the more to the rich side the air-fuel ratio (A/F)in becomes, the higher the hydrocarbon concentration.

Figure 5:
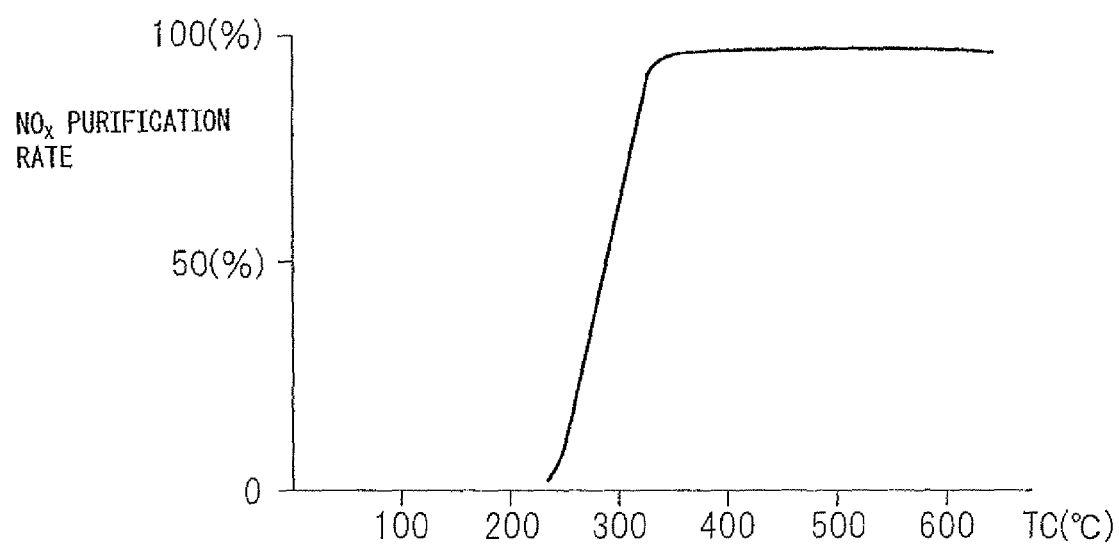
[FIG. 5]

FIG. 5 shows the $NO_X$ purification rate by the exhaust purification catalyst 13 with respect to the catalyst temperatures TC of the exhaust purification catalyst 13 when periodically making the concentration of hydrocarbons which flow into the exhaust purification catalyst 13 change so as to, as shown in FIG. 4, make the air-fuel ratio (A/F)in of the exhaust gas flowing to the exhaust purification catalyst 13 change. The inventors engaged in research relating to $NO_X$ purification for a long time. In the process of research, they learned that if making the concentration of hydrocarbons which flow into the exhaust purification catalyst 13 vibrate by within a predetermined range of amplitude and within a predetermined range of period, as shown in FIG. 5, an extremely high $NO_X$ purification rate is obtained even in a 400° C. or higher high temperature region.

Figure 6A:
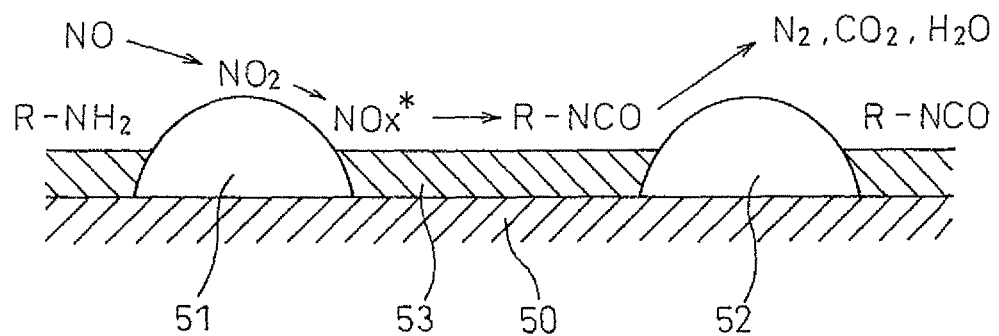
FIGS. 6A and 6B are views for explaining an oxidation reduction reaction in an exhaust purification catalyst.
Figure 6B:
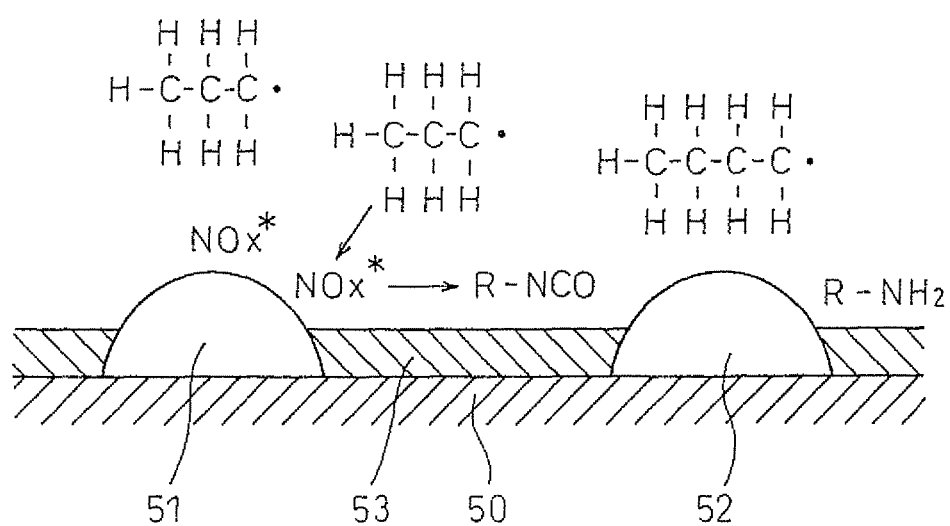

Furthermore, at this time, a large amount of reducing intermediates which contain nitrogen and hydrocarbons continues to be held or adsorbed on the surface of the basic layer 53, that is, on the basic exhaust gas flow surface parts 54 of the exhaust purification catalyst 13. It is learned that the reducing intermediates play a central role in obtaining a high $NO_X$ purification rate. Next, this will be explained with reference to FIGS. 6A and 6B. Note that, these FIGS. 6A and 6B schematically show the surface part of the catalyst carrier 50 of the exhaust purification catalyst 13. These FIGS. 6A and 6B show the reaction which is presumed to occur when the concentration of hydrocarbons which flow into the exhaust purification catalyst 13 is made to vibrate by within a predetermined range of amplitude and within a predetermined range of period.

FIG. 6A shows when the concentration of hydrocarbons which flow into the exhaust purification catalyst 13 is low, while FIG. 6B shows when hydrocarbons are fed from the hydrocarbon feed valve 15 and the concentration of hydrocarbons which flow into the exhaust purification catalyst 13 becomes higher.

Now, as will be understood from FIG. 4, the air-fuel ratio of the exhaust gas which flows into the exhaust purification catalyst 13 is maintained lean except for an instant, so the exhaust gas which flows into the exhaust purification catalyst 13 normally becomes a state of oxygen excess. At this time, part of the NO which is contained in the exhaust gas deposits on the exhaust purification catalyst 13, while part of the NO which is contained in the exhaust gas, as shown in FIG. 6A, is oxidized on the platinum 51 and becomes $NO_2$. Next, this $NO_2$ is further oxidized and becomes $NO_3$. Further, part of the $NO_2$ becomes $NO_2^-$. Therefore, on the platinum Pt 51, $NO_2^-$ and $NO_3$ are produced. The NO which is deposited on the exhaust purification catalyst 13 and the $NO_2^-$ and $NO_3$ which are formed on the platinum Pt 51 are strong in activity. Therefore, below, these NO, $NO_2^-$, and $NO_3$ will be referred to as the "active $NO_X^*$".

On the other hand, if hydrocarbons are fed from the hydrocarbon feed valve 15, the hydrocarbons successively deposit over the entire exhaust purification catalyst 13. The majority of the deposited hydrocarbons successively react with oxygen and are burned. Part of the deposited hydrocarbons are successively reformed and become radicalized inside of the exhaust purification catalyst 13 as shown in FIG. 3. Therefore, as shown in FIG. 6B, the hydrogen concentration around the active $NO_X^*$ becomes higher. In this regard, if, after the active $NO_X^*$ is produced, the state of a high oxygen concentration around the active $NO_X^*$ continues for a constant time or more, the active $NO_X^*$ is oxidized and is absorbed in the form of nitrate ions $NO_3^-$ inside the basic layer 53. However, if, before this constant time elapses, the hydrocarbon concentration around the active $NO_X^*$ becomes higher, as shown in FIG. 6B, the active $NO_X^*$ reacts on the platinum 51 with the radical hydrocarbons HC to thereby form the reducing intermediates. The reducing intermediates are adhered or adsorbed on the surface of the basic layer 53.

Note that, at this time, the first produced reducing intermediate is considered to be a nitro compound $R-NO_2$. If this nitro compound $R-NO_2$ is produced, the result becomes a nitrile compound $R-CN$, but this nitrile compound $R-CN$ can only survive for an instant in this state, so immediately becomes an isocyanate compound $R-NCO$. This isocyanate compound $R-NCO$ becomes an amine compound $R-NH_2$ if hydrolyzed. However, in this case, what is hydrolyzed is considered to be part of the isocyanate compound $R-NCO$. Therefore, as shown in FIG. 6B, the majority of the reducing intermediates which are held or adsorbed on the surface of the basic layer 53 is believed to be the isocyanate compound $R-NCO$ and amine compound $R-NH_2$.

On the other hand, as shown in FIG. 6B, if the produced reducing intermediates are surrounded by the hydrocarbons HC, the reducing intermediates are blocked by the hydrocarbons HC and the reaction will not proceed any further. In this case, if the concentration of hydrocarbons which flow into the exhaust purification catalyst 13 is lowered and then the hydrocarbons which are deposited around the reducing intermediates will be oxidized and consumed and thereby the concentration of oxygen around the reducing intermediates becomes higher, the reducing intermediates react with the active $NO_X^*$ as shown in FIG. 6A, react with the surrounding oxygen, or break down on their own. Due to this, the reducing intermediates $R-NCO$ and $R-NH_2$ are converted to $N_2$, $CO_2$, and $H_2O$, therefore the $NO_X$ is removed.

In this way, in the exhaust purification catalyst 13, by making the concentration of hydrocarbons which flow into the exhaust purification catalyst 13 higher, reducing intermediates are produced. When the concentration of hydrocarbons which flow into the exhaust purification catalyst 13 is lowered, then the oxygen concentration is raised, the reducing intermediates react with the active $NO_X^*$ or oxygen or break down on their own whereby the $NO_X$ is removed. That is, in order for the exhaust purification catalyst 13 to remove the $NO_X$, the concentration of hydrocarbons which flow into the exhaust purification catalyst 13 has to be periodically changed.

Of course, in this case, it is necessary to raise the hydrocarbon concentration to a concentration sufficiently high for producing the reducing intermediates and it is necessary to lower the hydrocarbon concentration to a concentration sufficiently low for making the produced reducing intermediates react with the active $NO_X^*$ or oxygen or break down on their own. That is, it is necessary to make the concentration of hydrocarbons which flow into the exhaust purification catalyst 13 vibrate by within a predetermined range of amplitude. Note that, in this case, it is necessary to hold these reducing intermediates on the basic layer 53, that is, the basic exhaust gas flow surface parts 54, until the produced reducing intermediates $R-NCO$ and $R-NH_2$ react with the active $NO_X^*$ or oxygen or break down themselves. For this reason, the basic exhaust gas flow surface parts 54 are provided.

On the other hand, if lengthening the feed period of the hydrocarbons, the time until the oxygen concentration becomes higher becomes longer in the period after the hydrocarbons are fed until the hydrocarbons are next fed. Therefore, the active $NO_X^*$ is absorbed in the basic layer 53 in the form of nitrates without producing reducing intermediates. To avoid this, it is necessary to make the concentration of hydrocarbons which flow into the exhaust purification catalyst 13 vibrate by within a predetermined range of period.

Therefore, in this embodiment of the present invention, to make the $NO_X$ which is contained in the exhaust gas and the reformed hydrocarbons react and produce the reducing intermediates $R-NCO$ and $R-NH_2$ containing nitrogen and hydrocarbons, the precious metal catalysts 51 and 52 are carried on the exhaust gas flow surface of the exhaust purification catalyst 13. To hold the produced reducing intermediates $R-NCO$ and $R-NH_2$ inside the exhaust purification catalyst 13, the basic exhaust gas flow surface parts 54 are formed around the precious metal catalysts 51 and 52. The reducing intermediates $R-NCO$ and $R-NH_2$ which are held on the basic exhaust gas flow surface parts 54 are converted to $N_2$, $CO_2$, and $H_2O$. The vibration period of the hydrocarbon concentration is made the vibration period required for continuation of the production of the reducing intermediates $R-NCO$ and $R-NH_2$. Incidentally, in the example shown in FIG. 4, the injection interval is made 3 seconds.

Figure 7A:
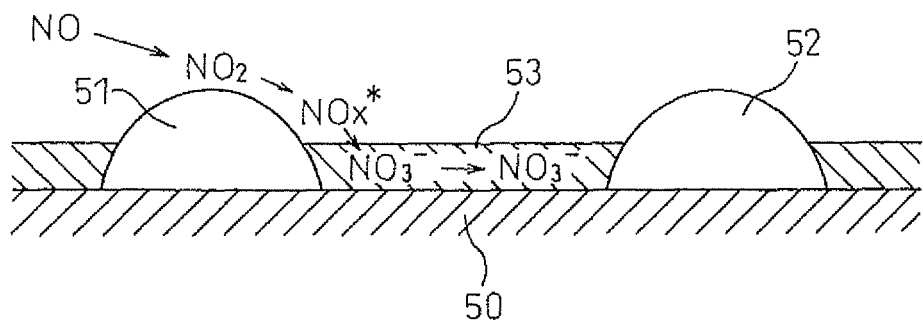
FIGS. 7A and 7B are views for explaining an oxidation reduction reaction in an exhaust purification catalyst.

If the vibration period of the hydrocarbon concentration, that is, the feed period of the hydrocarbons HC, is made longer than the above predetermined range of period, the reducing intermediates $R-NCO$ and $R-NH_2$ disappear from the surface of the basic layer 53. At this time, the active $NO_X^*$ which was produced on the platinum Pt 53, as shown in FIG. 7A, diffuses in the basic layer 53 in the form of nitrate ions $NO_3^-$ and becomes nitrates. That is, at this time, the $NO_X$ in the exhaust gas is absorbed in the form of nitrates inside of the basic layer 53.

Figure 7B:
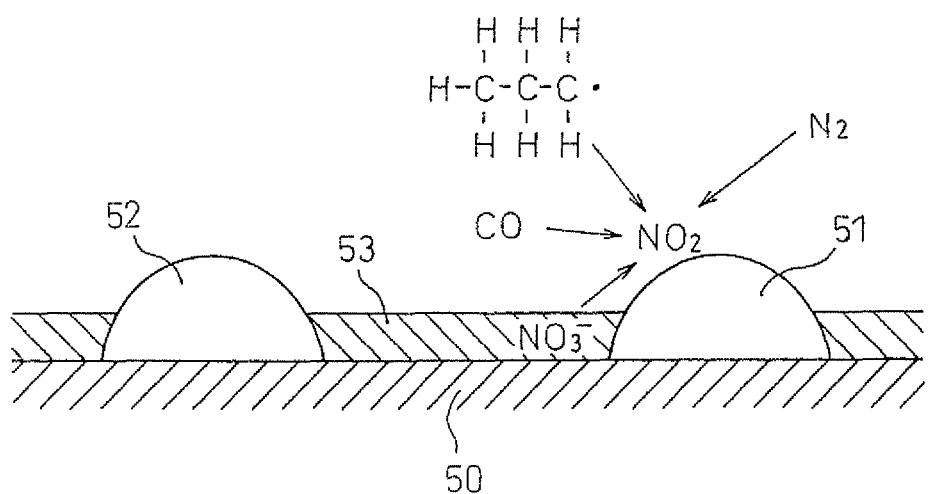

On the other hand, FIG. 7B shows the case where the air-fuel ratio of the exhaust gas which flows into the exhaust purification catalyst 13 is made the stoichiometric air-fuel ratio or rich when the $NO_X$ is absorbed in the form of nitrates inside of the basic layer 53. In this case, the oxygen concentration in the exhaust gas falls, so the reaction proceeds in the opposite direction ($NO_3^- \rightarrow NO_2$), and consequently the nitrates absorbed in the basic layer 53 successively become nitrate ions $NO_3^-$ and, as shown in FIG. 7B, are released from the basic layer 53 in the form of $NO_2$. Next, the released $NO_2$ is reduced by the hydrocarbons HC and CO contained in the exhaust gas.

Figure 8:
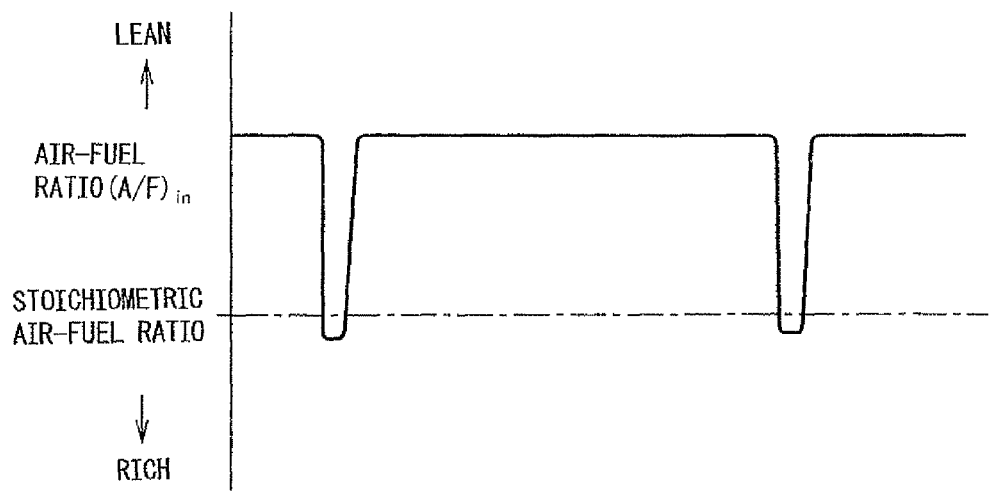
[FIG. 8]

FIG. 8 shows the case of making the air-fuel ratio (A/F)in of the exhaust gas which flows into the exhaust purification catalyst 13 temporarily rich slightly before the $NO_X$ absorption ability of the basic layer 53 becomes saturated. Note that, in the example shown in FIG. 8, the time interval of this rich control is 1 minute or more. In this case, the $NO_X$ which was absorbed in the basic layer 53 when the air-fuel ratio (A/F)in of the exhaust gas was lean is released all at once from the basic layer 53 and reduced when the air-fuel ratio (A/F)in of the exhaust gas is made temporarily rich. Therefore, in this case, the basic layer 53 plays the role of an absorbent for temporarily absorbing $NO_X$.

Note that, at this time, sometimes the basic layer 53 temporarily adsorbs the $NO_X$. Therefore, if using term of "storage" as a term including both "absorption" and "adsorption", at this time, the basic layer 53 performs the role of an $NO_X$ storage agent for temporarily storing the $NO_X$. That is, in this case, if the ratio of the air and fuel (hydrocarbons) which are supplied into the engine intake passage, combustion chambers 2, and upstream of the exhaust purification catalyst 13 in the exhaust passage is referred to as "the air-fuel ratio of the exhaust gas", the exhaust purification catalyst 13 functions as an $NO_X$ storage catalyst which stores the $NO_X$ when the air-fuel ratio of the exhaust gas is lean and releases the stored $NO_X$ when the oxygen concentration in the exhaust gas falls.

Figure 9:
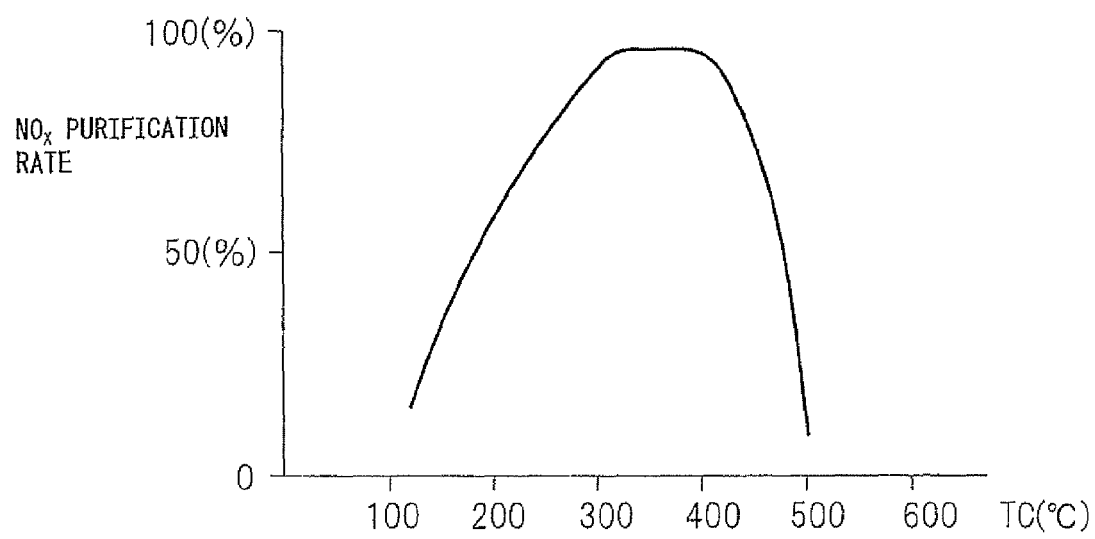
[FIG. 9]

FIG. 9 shows the $NO_X$ purification rate when making the exhaust purification catalyst 13 function as an $NO_X$ storage catalyst in this way. Note that, the abscissa of the FIG. 9 shows the catalyst temperature TC of the exhaust purification catalyst 13. When making the exhaust purification catalyst 13 function as an $NO_X$ storage catalyst, as shown in FIG. 9, when the catalyst temperature TC is 300° C. to 400° C., an extremely high $NO_X$ purification rate is obtained, but when the catalyst temperature TC becomes a 400° C. or higher high temperature, the $NO_X$ purification rate falls.

In this way, when the catalyst temperature TC becomes 400° C. or more, the $NO_X$ purification rate falls because if the catalyst temperature TC becomes 400° C. or more, the nitrates break down by heat and are released in the form of $NO_2$ from the exhaust purification catalyst 13. That is, so long as storing $NO_X$ in the form of nitrates, when the catalyst temperature TC is high, it is difficult to obtain a high $NO_X$ purification rate. However, in the new $NO_X$ purification method shown from FIG. 4 to FIGS. 6A and 6B, as will be understood from FIGS. 6A and 6B, nitrates are not formed or even if formed are extremely small in amount, consequently, as shown in FIG. 5, even when the catalyst temperature TC is high, a high $NO_X$ purification rate is obtained.

Therefore, in an embodiment of the present invention, to use this new $NO_X$ purification method to be able to remove $NO_X$, the hydrocarbon feed valve 15 for feeding hydrocarbons is arranged inside of the engine exhaust passage, the exhaust purification catalyst 13 for causing $NO_X$ contained in exhaust gas and reformed hydrocarbons to react is arranged downstream of the hydrocarbon feed valve 15 in the engine exhaust passage, precious metal catalysts 51 and 52 are carried on the exhaust gas flow surface of the exhaust purification catalyst 13, basic exhaust gas flow surface parts 54 are formed around the precious metal catalysts 51 and 52, the exhaust purification catalyst 13 has the property of reducing the $NO_X$ which is contained in exhaust gas if the concentration of hydrocarbons which flow into the exhaust purification catalyst 13 is made to vibrate by within a predetermined range of amplitude and within a predetermined range of period and has the property of being increased in storage amount of $NO_X$ which is contained in exhaust gas if the vibration period of the hydrocarbon concentration is made longer than this predetermined range, and, at the time of engine operation, the concentration of hydrocarbons which flow into the exhaust purification catalyst 13 is made to vibrate by within the predetermined range of amplitude and within the predetermined range of period to thereby reduce the $NO_X$ which is contained in the exhaust gas in the exhaust purification catalyst 13.

That is, the $NO_X$ purification method which is shown from FIG. 4 to FIGS. 6A and 6B can be said to be a new $NO_X$ purification method designed to remove $NO_X$ without forming almost any nitrates in the case of using an exhaust purification catalyst which carries precious metal catalysts and forms a basic layer which can absorb $NO_X$. In actuality, when using this new $NO_X$ purification method, the nitrates which are detected from the basic layer 53 become much smaller in amount compared with the case where making the exhaust purification catalyst 13 function as an $NO_X$ storage catalyst.

Note that, this new $NO_X$ purification method will be referred to below as the "first $NO_X$ purification method".

Next, referring to FIG. 10 to FIG. 15, this first $NO_X$ purification method will be explained in a bit more detail.

Figure 10:
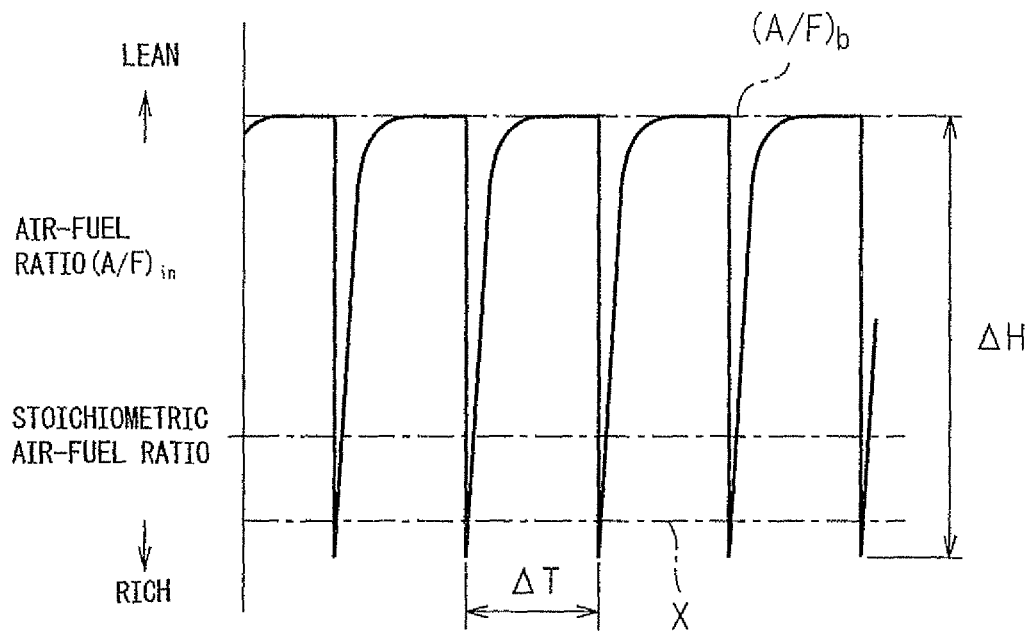
[FIG. 10]

FIG. 10 shows enlarged the change in the air-fuel ratio (A/F)in shown in FIG. 4. Note that, as explained above, the change in the air-fuel ratio (A/F)in of the exhaust gas which flows into this exhaust purification catalyst 13 simultaneously shows the change in concentration of the hydrocarbons which flow into the exhaust purification catalyst 13. Note that, in FIG. 10, ΔH shows the amplitude of the change in concentration of hydrocarbons HC which flow into the exhaust purification catalyst 13, while ΔT shows the vibration period of the concentration of the hydrocarbons which flow into the exhaust purification catalyst 13.

Furthermore, in FIG. 10, (A/F)b shows the base air-fuel ratio which shows the air-fuel ratio of the combustion gas for generating the engine output. In other words, this base air-fuel ratio (A/F)b shows the air-fuel ratio of the exhaust gas which flows into the exhaust purification catalyst 13 when stopping the feed of hydrocarbons. On the other hand, in FIG. 10, X shows the upper limit of the air-fuel ratio (A/F)in used for producing the reducing intermediates without the produced active $NO_X^*$ being stored in the form of nitrates inside the basic layer 53 much at all. To make the active $NO_X^*$ and the reformed hydrocarbons react to produce reducing intermediates, the air-fuel ratio (A/F)in has to be made lower than this upper limit X of the air-fuel ratio.

In other words, in FIG. 10, X shows the lower limit of the hydrocarbon concentration required for making the active $NO_X^*$ and reformed hydrocarbons react to produce reducing intermediates. To produce the reducing intermediates, the hydrocarbon concentration has to be made higher than this lower limit X. In this case, whether the reducing intermediates are produced is determined by the ratio of the oxygen concentration and hydrocarbon concentration around the active $NO_X^*$, that is, the air-fuel ratio (A/F)in. The upper limit X of the air-fuel ratio required for producing the reducing intermediates will below be called the "demanded minimum air-fuel ratio".

In the example shown in FIG. 10, the demanded minimum air-fuel ratio X is rich, therefore, in this case, to form the reducing intermediates, the air-fuel ratio (A/F)in is instantaneously made the demanded minimum air-fuel ratio X or less, that is, rich. As opposed to this, in the example shown in FIG. 11, the demanded minimum air-fuel ratio X is lean. In this case, the air-fuel ratio (A/F)in is maintained lean while periodically reducing the air-fuel ratio (A/F)in so as to form the reducing intermediates.

In this case, whether the demanded minimum air-fuel ratio X becomes rich or becomes lean depends on the oxidizing power of the exhaust purification catalyst 13. In this case, the exhaust purification catalyst 13, for example, becomes stronger in oxidizing power if increasing the carried amount of the precious metal 51 and becomes stronger in oxidizing power if strengthening the acidity. Therefore, the oxidizing power of the exhaust purification catalyst 13 changes due to the carried amount of the precious metal 51 or the strength of the acidity.

Figure 11:
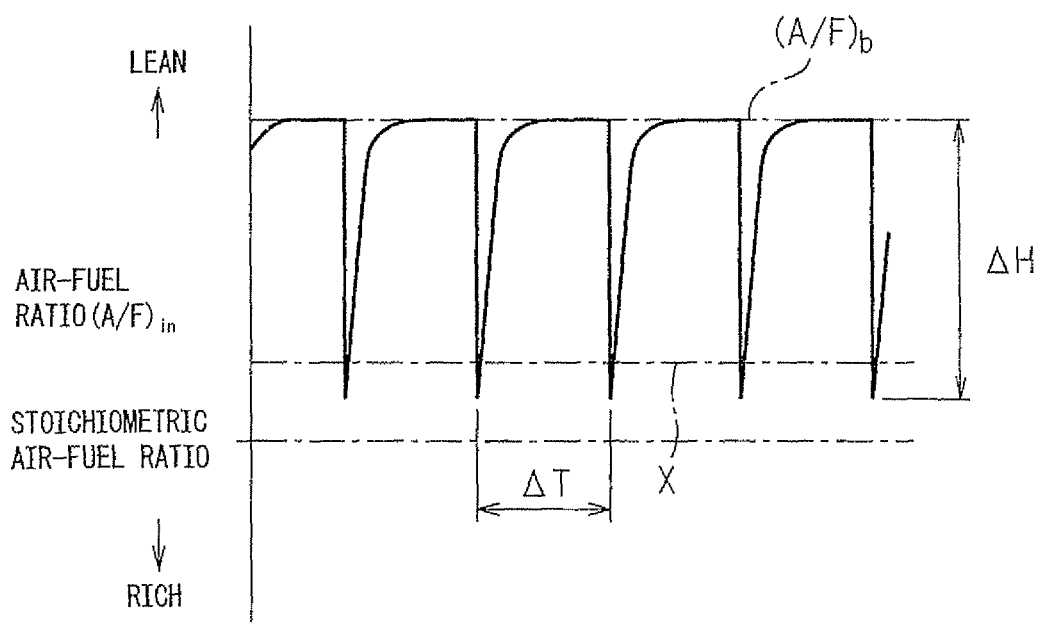
FIG. 11 is a time chart which shows changes in an air-fuel ratio of exhaust gas which flows into an exhaust purification catalyst.

Now, if using an exhaust purification catalyst 13 with a strong oxidizing power, as shown in FIG. 11, if maintaining the air-fuel ratio (A/F)in lean while periodically lowering the air-fuel ratio (A/F)in, the hydrocarbons end up becoming completely oxidized when the air-fuel ratio (A/F)in is reduced. As a result, reducing intermediates can no longer be produced. As opposed to this, when using an exhaust purification catalyst 13 with a strong oxidizing power, as shown in FIG. 10, if making the air-fuel ratio (A/F)in periodically rich, when the air-fuel ratio (A/F)in is made rich, part of the hydrocarbons will not be completely oxidized, but will be partially oxidized, that is, the hydrocarbons will be reformed, consequently reducing intermediates will be produced. Therefore, when using an exhaust purification catalyst 13 with a strong oxidizing power, the demanded minimum air-fuel ratio X has to be made rich.

On the other hand, when using an exhaust purification catalyst 13 with a weak oxidizing power, as shown in FIG. 11, if maintaining the air-fuel ratio (A/F)in lean while periodically lowering the air-fuel ratio (A/F)in, part of the hydrocarbons will not be completely oxidized, but will be partially oxidized, that is, the hydrocarbons will be reformed, and consequently reducing intermediates will be produced. As opposed to this, when using an exhaust purification catalyst 13 with a weak oxidizing power, as shown in FIG. 10, if making the air-fuel ratio (A/F)in periodically rich, a large amount of hydrocarbons will be exhausted from the exhaust purification catalyst 13 without being oxidized and consequently the amount of hydrocarbons which is wastefully consumed will increase. Therefore, when using an exhaust purification catalyst 13 with a weak oxidizing power, the demanded minimum air-fuel ratio X has to be made lean.

Figure 12:
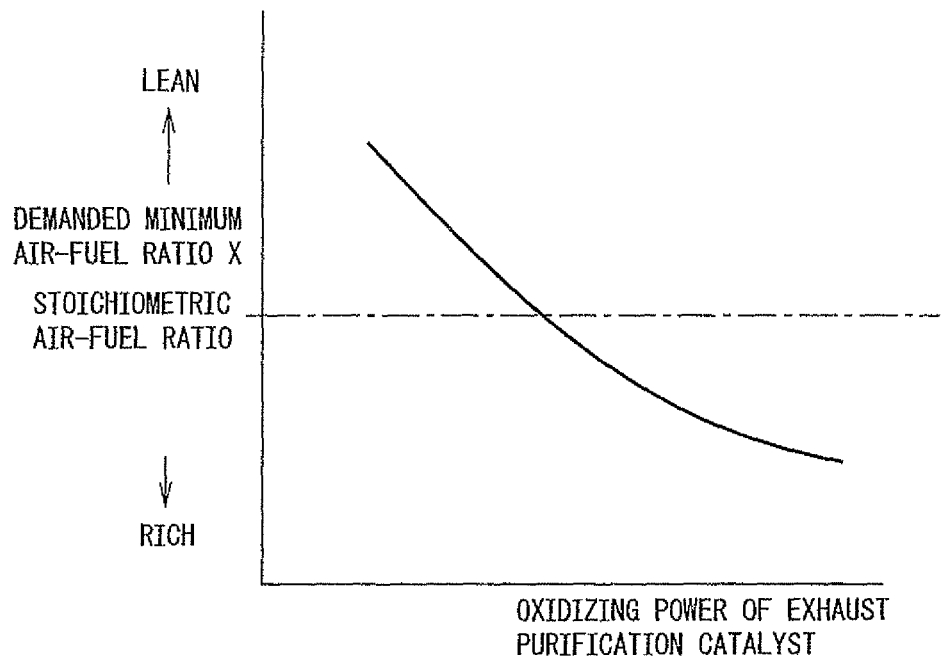
[FIG. 12]

That is, it is learned that the demanded minimum air-fuel ratio X, as shown in FIG. 12, has to be reduced the stronger the oxidizing power of the exhaust purification catalyst 13. In this way, the demanded minimum air-fuel ratio X becomes lean or rich due to the oxidizing power of the exhaust purification catalyst 13. Below, taking as example the case where the demanded minimum air-fuel ratio X is rich, the amplitude of the change in concentration of hydrocarbons which flow into the exhaust purification catalyst 13 and the vibration period of the concentration of hydrocarbons which flow into the exhaust purification catalyst 13 will be explained.

Now, if the base air-fuel ratio (A/F)b becomes larger, that is, if the oxygen concentration in the exhaust gas before the hydrocarbons are fed becomes higher, the feed amount of hydrocarbons required for making the air-fuel ratio (A/F)in the demanded minimum air-fuel ratio X or less increases and along with this the excess amount of hydrocarbons which do not contribute to the production of the reducing intermediates also increases. In this case, to remove the $NO_X$ well, as explained above, it is necessary to make the excess hydrocarbons oxidize. Therefore, to remove the $NO_X$ well, the larger the amount of excess hydrocarbons, the larger the amount of oxygen which is required.

In this case, if raising the oxygen concentration in the exhaust gas, the amount of oxygen can be increased. Therefore, to remove the $NO_X$ well, when the oxygen concentration in the exhaust gas before the hydrocarbons are fed is high, it is necessary to raise the oxygen concentration in the exhaust gas after feeding the hydrocarbons. That is, the higher the oxygen concentration in the exhaust gas before the hydrocarbons are fed, the larger the amplitude of the hydrocarbon concentration has to be made.

Figure 13:
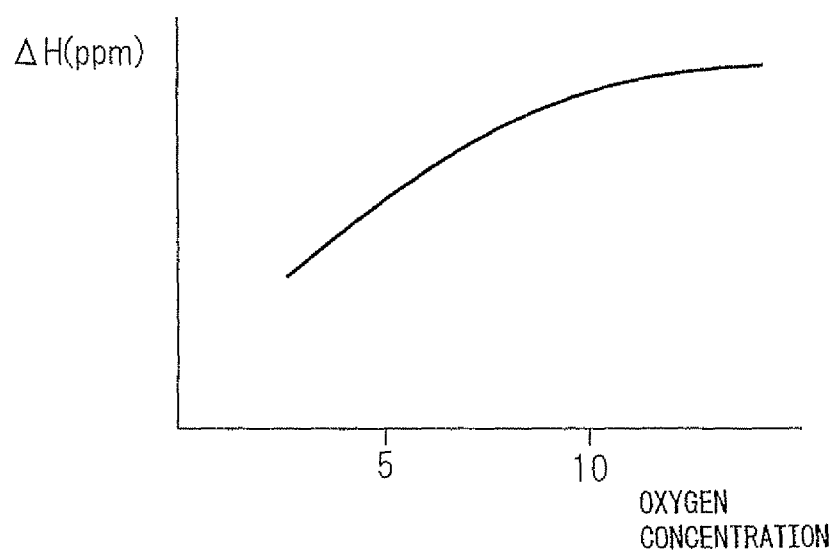
[FIG. 13]

FIG. 13 shows the relationship between the oxygen concentration in the exhaust gas before the hydrocarbons are fed and the amplitude $\Delta H$ of the hydrocarbon concentration when the same $NO_X$ purification rate is obtained. To obtain the same $NO_X$ purification rate from FIG. 13, it is learned that the higher the oxygen concentration in the exhaust gas before the hydrocarbons are fed, the greater the amplitude $\Delta H$ of the hydrocarbon concentration has to be made. That is, to obtain the same $NO_X$ purification rate, the higher the base air-fuel ratio (A/F)b, the greater the amplitude $\Delta T$ of the hydrocarbon concentration has to be made. In other words, to remove the $NO_X$ well, the lower the base air-fuel ratio (A/F)b, the more the amplitude $\Delta T$ of the hydrocarbon concentration can be reduced.

Figure 14:
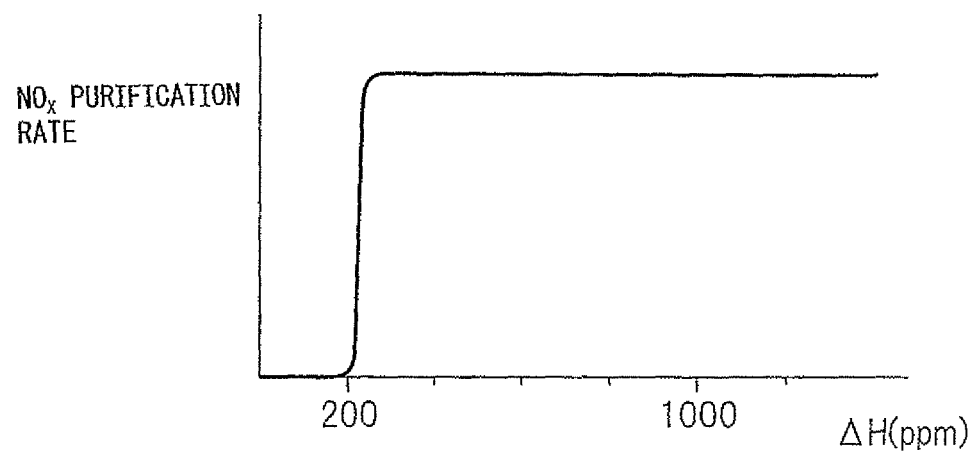
[FIG. 14]

In this regard, the base air-fuel ratio (A/F)b becomes the lowest at the time of an acceleration operation. At this time, if the amplitude $\Delta H$ of the hydrocarbon concentration is about 200 ppm, it is possible to remove the $NO_X$ well. The base air-fuel ratio (A/F)b is normally larger than the time of acceleration operation. Therefore, as shown in FIG. 14, if the amplitude $\Delta H$ of the hydrocarbon concentration is 200 ppm or more, an excellent $NO_X$ purification rate can be obtained.

On the other hand, it is learned that when the base air-fuel ratio (A/F)b is the highest, if making the amplitude $\Delta H$ of the hydrocarbon concentration 10000 ppm or so, an excellent $NO_X$ purification rate is obtained. Therefore, in the present invention, the predetermined range of the amplitude of the hydrocarbon concentration is made 200 ppm to 10000 ppm.

Figure 15:
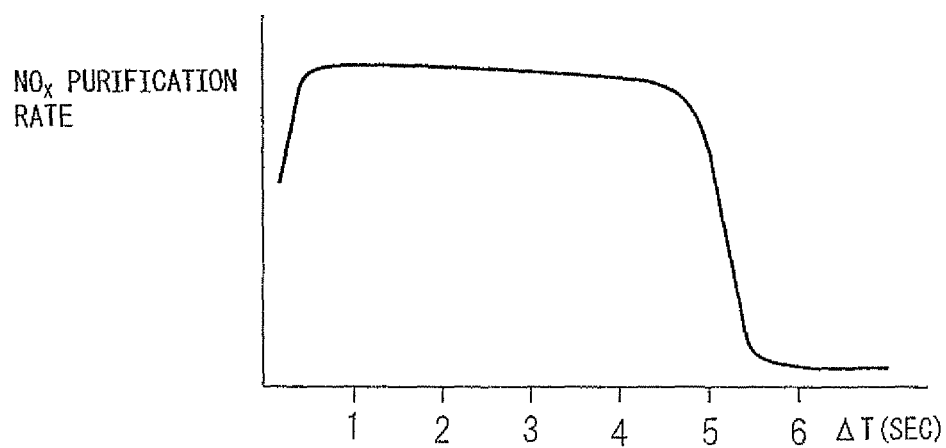
[FIG. 15]

Further, if the vibration period $\Delta T$ of the hydrocarbon concentration becomes longer, the time period where the oxygen concentration around the active $NO_X^*$ becomes higher becomes longer in the time period after the hydrocarbons are fed to when the hydrocarbons are next fed. In this case, in the embodiment which is shown in FIG. 1, if the vibration period $\Delta T$ of the hydrocarbon concentration becomes longer than about 5 seconds, the active $NO_X^*$ starts to be absorbed in the form of nitrates inside the basic layer 53. Therefore, as shown in FIG. 15, if the vibration period $\Delta T$ of the hydrocarbon concentration becomes longer than about 5 seconds, the $NO_X$ purification rate falls. Therefore, the vibration period $\Delta T$ of the hydrocarbon concentration has to be made 5 seconds or less.

On the other hand, in this embodiment according to the present invention, if the vibration period $\Delta T$ of the hydrocarbon concentration becomes about 0.3 second or less, the fed hydrocarbons start to build up on the exhaust gas flow surface of the exhaust purification catalyst 13, therefore, as shown in FIG. 15, if the vibration period $\Delta T$ of the hydrocarbon concentration becomes about 0.3 second or less, the $NO_X$ purification rate falls. Therefore, in the present invention, the vibration period of the hydrocarbon concentration is made from 0.3 second to 5 seconds.

Figure 16A:
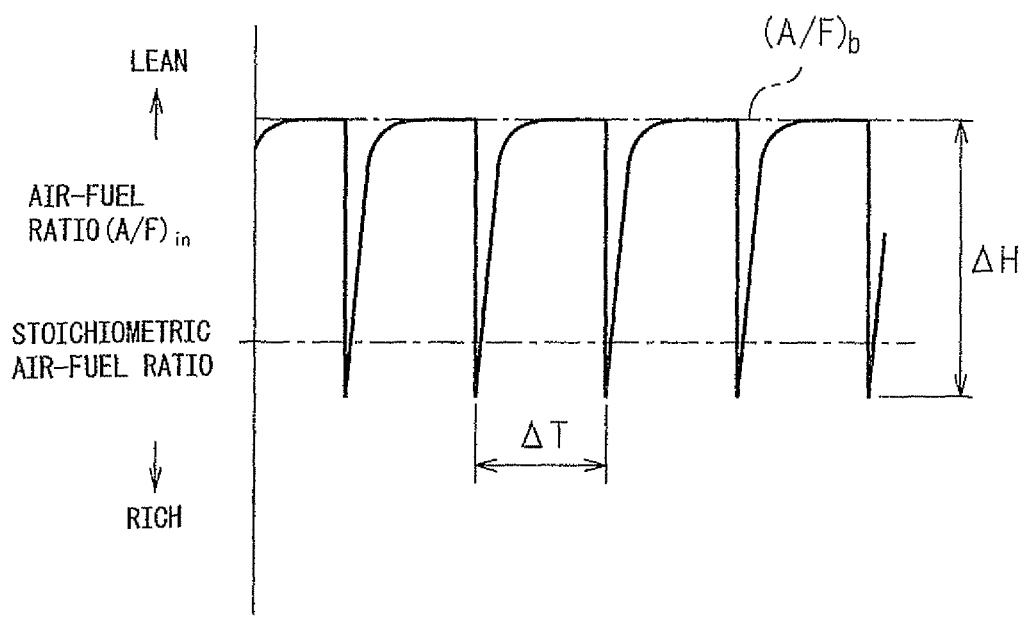
FIGS. 16A and 16B are views which show changes in the air-fuel ratio of the exhaust gas which flows into an exhaust purification catalyst etc.
Figure 16B:
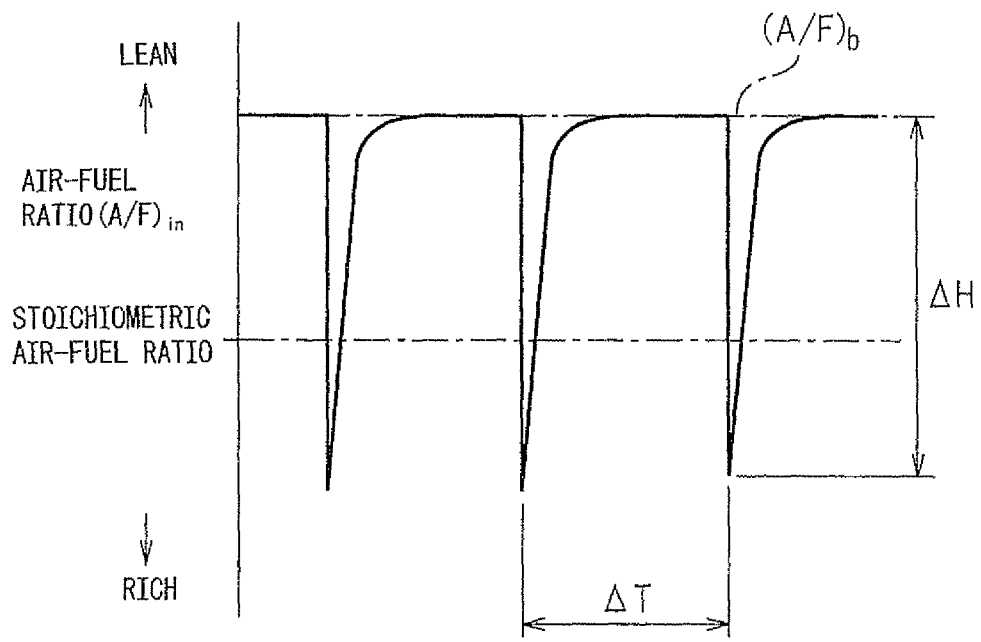

Next, referring to FIGS. 16A and 16B, the hydrocarbon injection control in the case where an exhaust gas recirculation action by the high pressure exhaust gas recirculation system HPL is performed and an exhaust gas recirculation action by the low pressure exhaust gas recirculation system LPL is performed will be explained. FIG. 16A shows the optimum vibration amplitude and vibration period of the hydrocarbon concentration when an $NO_X$ purification action by the first $NO_X$ purification method is being performed in the state where an exhaust gas recirculation action by the high pressure exhaust gas recirculation system HPL is being performed, while FIG. 16B shows the optimum vibration amplitude and vibration period of the hydrocarbon concentration when an $NO_X$ purification action by the first $NO_X$ purification method is being performed in the state where an exhaust gas recirculation action by the low pressure exhaust gas recirculation system LPL is being performed.

Now, when an exhaust gas recirculation action by the high pressure exhaust gas recirculation system HPL is being performed, part of the exhaust gas which is exhausted from the engine is returned to the intake passage side without being sent to the exhaust purification catalyst 13. As opposed to this, when an exhaust gas recirculation action by the low pressure exhaust gas recirculation system LPL is being performed, all of the exhaust gas which is exhausted from the engine is sent to the exhaust purification catalyst 13. Therefore, when the same amount of exhaust gas is recirculated under the same engine operating state, compared with an exhaust gas recirculation action by the high pressure exhaust gas recirculation system HPL, an exhaust gas recirculation action by the low pressure exhaust gas recirculation system LPL results in a greater amount of exhaust gas which flows into the exhaust purification catalyst 13 per unit time.

If the amount of exhaust gas which flows into the exhaust purification catalyst 13 per unit time becomes greater, the amount of feed of hydrocarbons required for making the air-fuel ratio (A/F)in of the exhaust gas which flows into the exhaust purification catalyst 13 the demanded minimum air-fuel ratio X or less increases. Therefore, as shown in FIG. 16B, the vibration amplitude of the hydrocarbon concentration is made greater. Furthermore, at this time, to prevent the amount of feed of hydrocarbons per unit time from changing, as shown in FIG. 16B, the vibration period of the hydrocarbon concentration is made longer. That is, in this embodiment according to the present invention, when an $NO_X$ purification action by the first $NO_X$ purification method is being performed while performing the exhaust gas recirculation action by the low pressure exhaust gas recirculation system LPL, compared with when an $NO_X$ purification action by the first $NO_X$ purification method is being performed while performing the exhaust gas recirculation action by the high pressure exhaust gas recirculation system HPL under the same engine operating state, the vibration period of the hydrocarbon concentration is made longer the greater the amplitude of the hydrocarbon concentration.

Figure 17A:
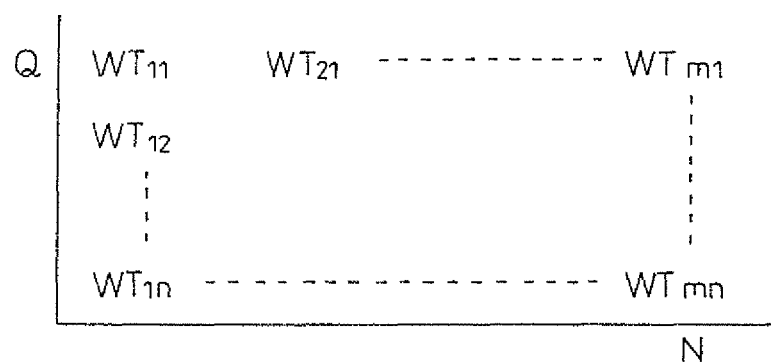
FIGS. 17A and 17B are views which show the injection time of hydrocarbons etc.
Figure 17B:
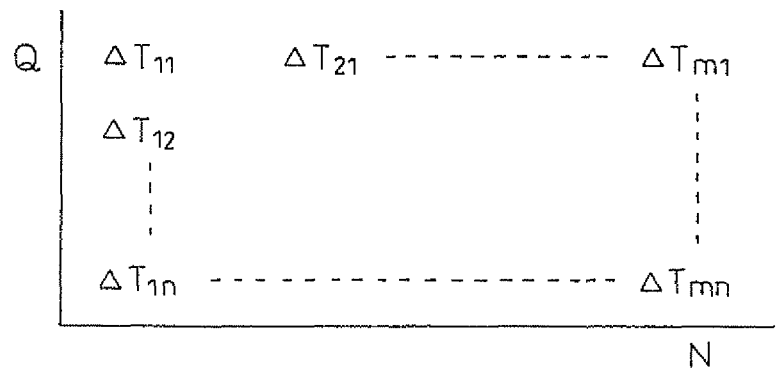

Now then, in this embodiment according to the present invention, control is performed so as to change the injection amount and injection timing of hydrocarbons from the hydrocarbon feed valve 15 so that the amplitude $\Delta H$ and vibration period $\Delta T$ of the hydrocarbon concentration become the optimal values for the engine operating state. In this case, in this embodiment according to the present invention, the optimum hydrocarbon injection amount WT for when performing an exhaust gas recirculation action by the high pressure exhaust gas recirculation system HPL while performing an $NO_X$ purification action by the first $NO_X$ purification method is stored as a function of the injection amount Q from fuel injectors 3 and the engine speed N in the form of a map such as shown in FIG. 17A in advance in the ROM 32. Further, the optimum injection period $\Delta T$ of hydrocarbons at this time is stored as a function of the injection amount Q from the fuel injectors 3 and the engine speed N in the form of a map such as shown in FIG. 17B in advance in the ROM 32. Simultaneously, the optimum hydrocarbon injection amount WT and injection period $\Delta T$ when performing an exhaust gas recirculation action by the low pressure exhaust gas recirculation system LPL while performing a $NO_X$ purification action by the first $NO_X$ purification method are also stored as functions of the injection amount Q from the fuel injectors 3 and the engine speed N respectively in advance in the ROM 32.

Next, referring to FIG. 18 to FIG. 21, an $NO_X$ purification method when making the exhaust purification catalyst 13 function as an $NO_X$ storage catalyst will be explained specifically. The $NO_X$ purification method in the case of making the exhaust purification catalyst 13 function as an $NO_X$ storage catalyst in this way will be referred to below as the "second $NO_X$ purification method".

Figure 18:
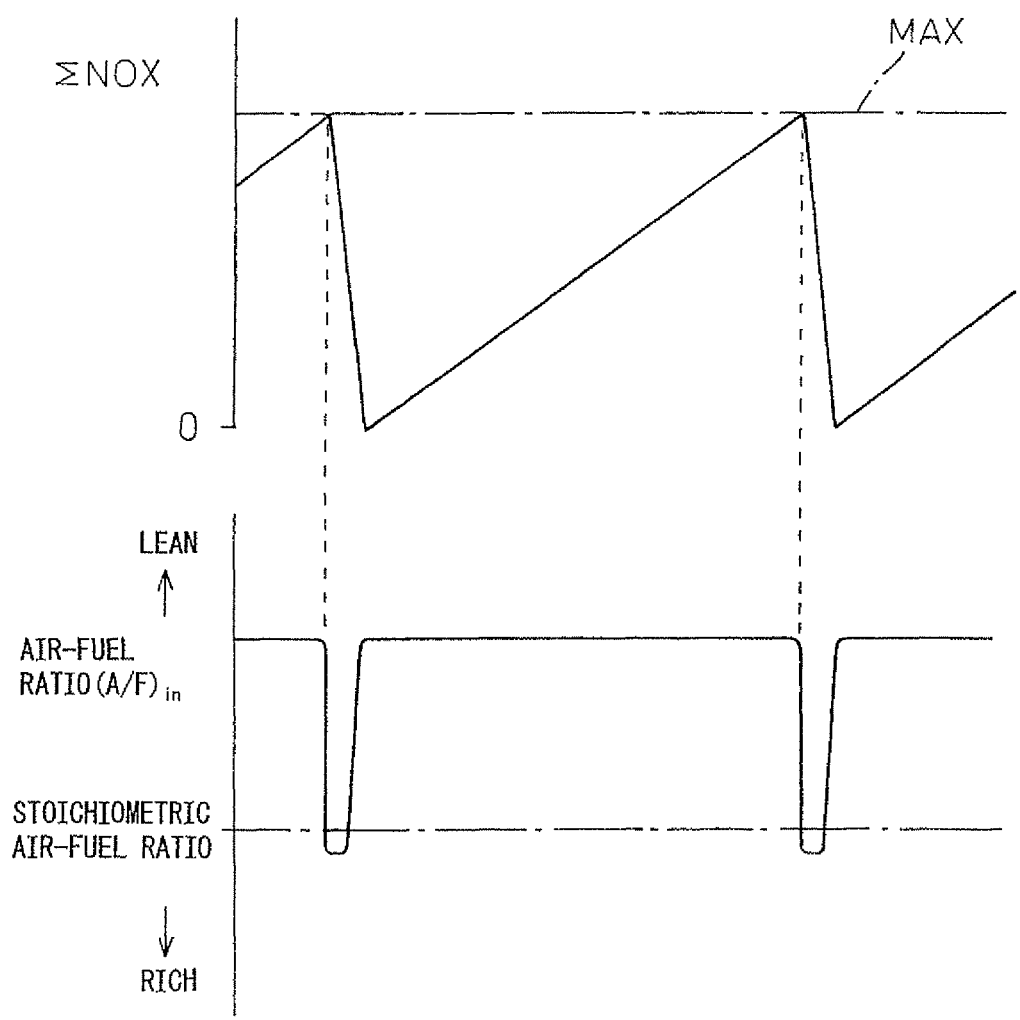
[FIG. 18]

In this second $NO_X$ purification method, as shown in FIG. 18, when the stored $NO_X$ amount $\Sigma NO_X$ of $NO_X$ which is stored in the basic layer 53 exceeds a predetermined allowable amount MAX, the air-fuel ratio (A/F)in of the exhaust gas flowing into the exhaust purification catalyst 13 is temporarily made rich. If the air-fuel ratio (A/F)in of the exhaust gas is made rich, the $NO_X$ which was stored in the basic layer 53 when the air-fuel ratio (A/F)in of the exhaust gas was lean is released from the basic layer 53 all at once and reduced. Due to this, the $NO_X$ is removed.

Figure 19:
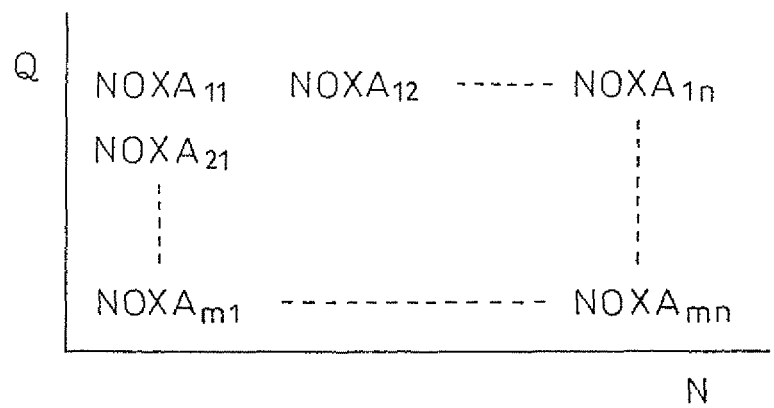
[FIG. 19]

The stored $NO_X$ amount $\Sigma NO_X$ is, for example, calculated from the amount of $NO_X$ which is exhausted from the engine. In this embodiment according to the present invention, the exhausted $NO_X$ amount NOXA of $NO_X$ which is exhausted from the engine per unit time is stored as a function of the injection amount Q and engine speed N in the form of a map such as shown in FIG. 19 in advance in the ROM 32. The stored $NO_X$ amount $\Sigma NO_X$ is calculated from the exhausted $NO_X$ amount NOXA. In this case, as explained before, the period during which the air-fuel ratio (A/F)in of the exhaust gas is made rich is usually 1 minute or more.

Figure 20:
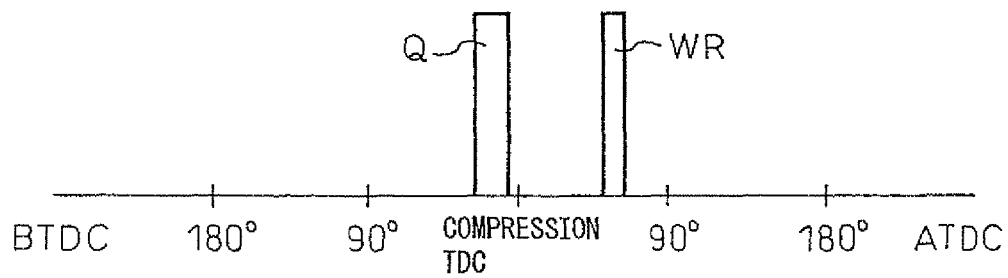
[FIG. 20]
Figure 21:
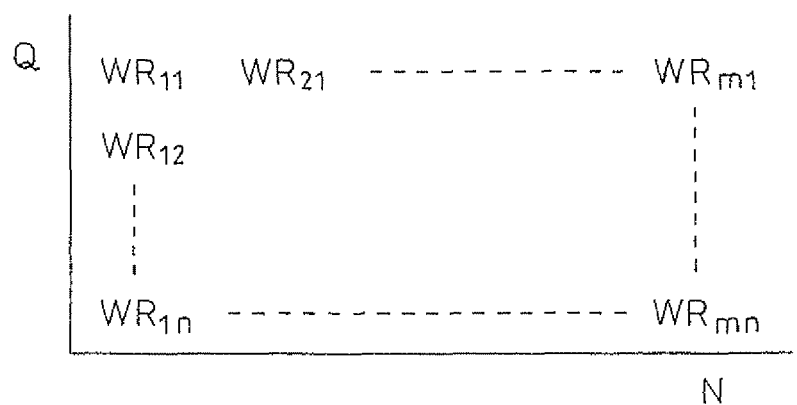
[FIG. 21]

In this second $NO_X$ purification method, as shown in FIG. 20, in each combustion chamber 2, the fuel injector 3 injects additional fuel WR in addition to the combustion-use fuel Q so that the air-fuel ratio (A/F)in of the exhaust gas which flows into the exhaust purification catalyst 13 is made rich. Note that, in FIG. 20, the abscissa indicates the crank angle. This additional fuel WR is injected at a timing at which it will burn, but will not appear as engine output, that is, slightly before ATDC90° after compression top dead center. This fuel amount WR is stored as a function of the injection amount Q and engine speed N in the form of a map such as shown in FIG. 21 in advance in the ROM 32. Of course, in this case, it is also possible to make the injection amount of hydrocarbons from the hydrocarbon feed valve 15 increase so as to make the air-fuel ratio (A/F)in of the exhaust gas rich.

Now, the temperature of the exhaust gas which flows out from the exhaust purification catalyst 13 to the inside of the exhaust pipe 14 is considerably lower than the temperature of the exhaust gas which is exhausted to the inside of the exhaust manifold 5, therefore, the temperature of the exhaust gas which is recirculated by the low pressure exhaust gas recirculation system LPL to the inside of the combustion chambers 2 becomes considerably lower than the temperature of the exhaust gas which is recirculated by the high pressure exhaust gas recirculation system HPL to the inside of the combustion chambers 2. Therefore, use of the low pressure exhaust gas recirculation system LPL to recirculate exhaust gas, compared with use of the high pressure exhaust gas recirculation system HPL to recirculate exhaust gas, results in the combustion temperature in the combustion chambers 2 falling and the amount of production of $NO_X$ in the combustion chambers 2 falling. That is, using the low pressure exhaust gas recirculation system LPL to recirculate the exhaust gas, compared with using the high pressure exhaust gas recirculation system HPL to recirculate the exhaust gas, enables a reduction of the amount of $NO_X$ which is exhausted from the combustion chambers 2.

Therefore, in this embodiment according to the present invention, usually the low pressure exhaust gas recirculation system LPL is used for the recirculation action of exhaust gas. Only when use of the high pressure exhaust gas recirculation system HPL would be preferable over use of the low pressure exhaust gas recirculation system LPL is the high pressure exhaust gas recirculation system HPL used.

On the other hand, if comparing the $NO_X$ purification rate when using the first $NO_X$ purification method and the $NO_X$ purification rate when using the second $NO_X$ purification method, using the first $NO_X$ purification method enables a higher $NO_X$ purification rate to be obtained. On the other hand, the frequency of feed of hydrocarbons in the case of use of the first $NO_X$ purification method is considerably higher than the frequency of feed of hydrocarbons in the case of use of the second $NO_X$ purification method, so the amount of hydrocarbons which are consumed for removal of $NO_X$ becomes greater in the case of use of the first $NO_X$ purification method compared with the case of use of the second $NO_X$ purification method. That is, if viewed from the $NO_X$ purification rate, use of the first $NO_X$ purification method is preferable, but if viewed from the standpoint of the reduction of the amount of consumption of hydrocarbons, it can be said that use of the second $NO_X$ purification method is preferable.

Figure 22:
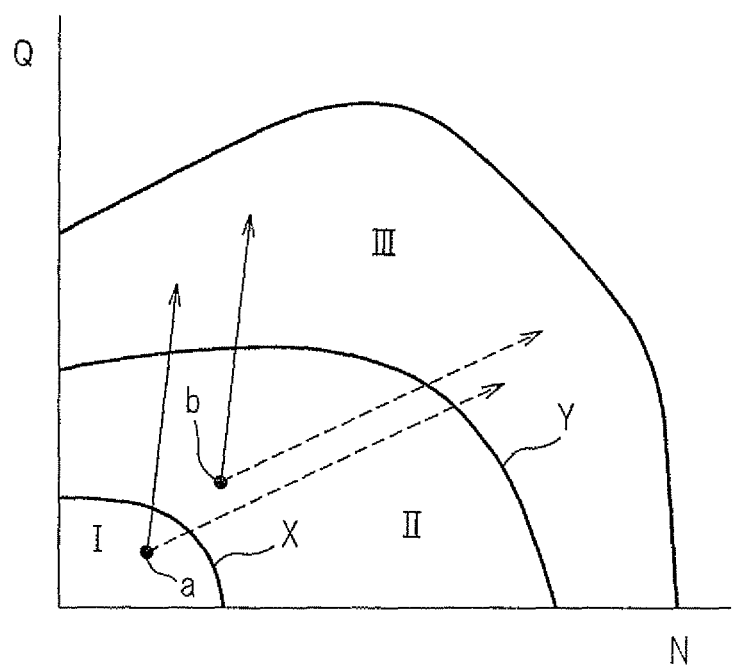
[FIG. 22]

If considering these facts, whether the low pressure exhaust gas recirculation system LPL is used or the high pressure exhaust gas recirculation system HPL is used determines whether the first $NO_X$ purification method is used or the second $NO_X$ purification method is used. In this embodiment according to the present invention, as shown in FIG. 22, the operating region of the engine is divided into three operating regions I, II, and III according to the fuel injection amount Q from the fuel injectors 3 and the engine speed N. At the time of steady operation, which of the low pressure exhaust gas recirculation system LPL and the high pressure exhaust gas recirculation system HPL is used and which of the first $NO_X$ purification method and the second $NO_X$ purification method is used are determined in advance for the operating regions I, II, and III.

In FIG. 22, the operating region II expresses the medium speed, medium load operating region which is used frequently at the time of steady operation. At the time of steady operation, in this operating region II, as the exhaust gas recirculation system, the low pressure exhaust gas recirculation system LPL is used, while as the $NO_X$ purification method, the second $NO_X$ purification method is used. That is, in the operating region II, the low pressure exhaust gas recirculation system LPL is used so as to reduce the amount of exhaust of $NO_X$ from the combustion chambers 2 and the second $NO_X$ purification method is used so as to reduce the amount of consumption of hydrocarbons.

On the other hand, in FIG. 22, the operating region III expresses the high speed, high load operating region. At the time of steady operation, in this operating region III, as the exhaust gas recirculation system, the low pressure exhaust gas recirculation system LPL is used, while as the $NO_X$ purification method, the first $NO_X$ purification method is used. That is, at the time of high speed, high load operation, the amount of exhaust of $NO_X$ from the combustion chambers 2 increases. Therefore, at this time, the low pressure exhaust gas recirculation system LPL is used so as to reduce the amount of exhaust of $NO_X$ from the combustion chambers 2 as much as possible and the first $NO_X$ purification method is used so as to obtain a high $NO_X$ purification rate. Note that in this operating region III, not limited to the time of steady operation, but also at the time of a transient operation such as at the time of an acceleration operation, the low pressure exhaust gas recirculation system LPL is used as the exhaust gas recirculation system and the first $NO_X$ purification method is used as the $NO_X$ purification method.

On the other hand, in FIG. 22, the operating region I expresses the low speed, low load operating region. At the time of steady operation, in this operating region I, as the exhaust gas recirculation system, the high pressure exhaust gas recirculation system HPL is used, while as the $NO_X$ purification method, the second $NO_X$ purification method is used. That is, at the time of low speed, low load operation, the temperature of the exhaust gas which is exhausted from the combustion chambers 2 is low. If at this time using the low pressure exhaust gas recirculation system LPL to recirculate the exhaust gas, the moisture which is contained in the exhaust gas will condense inside of the cooling device 25. As a result, the problem will arise of moisture ending up building up inside of the low pressure exhaust gas recirculation system LPL. To prevent such a problem from occurring, in the operating region I, the high pressure exhaust gas recirculation system HPL is used, while the second $NO_X$ purification method is used to reduce the amount of consumption of hydrocarbons.

In this way, in the embodiment which is shown in FIG. 22, at the time of steady operation, in the operating region II and III, the low pressure exhaust gas recirculation system LPL is used. Only in the operating region I is the high pressure exhaust gas recirculation system HPL used. On the other hand, at the time of steady operation, at the operating regions I and II, the second $NO_X$ purification method is used, while at the operating region III, the first $NO_X$ purification method is used. That is, in this embodiment according to the present invention, at the engine low speed, low load side, the $NO_X$ purification action by the second $NO_X$ purification method is performed, while at the engine high speed, high load side, the $NO_X$ purification action by the first $NO_X$ purification method is performed.

Next, the case of performing an acceleration operation when the operating state of the engine is the operating region I or II will be explained. FIG. 22 shows the change in the operating state when an acceleration operation is performed when the operating state of the engine is at the point a of the operating region I and the change in the operating state when an acceleration operation is performed when the operating state of the engine is at the point b of the operating region II by arrows. Note that, in FIG. 22, the broken line arrows show the changes in the operating states when an acceleration operation is performed with a degree of acceleration less than a predetermined degree, that is, when a slow acceleration operation is performed. In this way, when a slow acceleration operation with a degree of acceleration of less than a predetermined degree is performed, for the exhaust gas recirculation system and $NO_X$ purification method, the exhaust gas recirculation system and $NO_X$ purification method predetermined for the operating regions I, II, and III are used. For example, when the operating state of the engine is at the point a of the operating region I and slow acceleration operation is performed, the $NO_X$ purification action by the second $NO_X$ purification method is maintained while the recirculation action of exhaust gas by the high pressure exhaust gas recirculation system HPL is switched to a recirculation action of exhaust gas by the low pressure exhaust gas recirculation system LPL when the operating state of the engine crosses the boundary X of the operating regions I and II. On the other hand, the recirculation action of exhaust gas by the low pressure exhaust gas recirculation system LPL is maintained while the $NO_X$ purification action by the second $NO_X$ purification method is switched to the $NO_X$ purification action by the first $NO_X$ purification method when the operating state of the engine crosses the boundary Y of the operating regions II and III.

As opposed to this, when the operating state of the engine is the operating region I or II and an acceleration operation with a degree of acceleration of a predetermined degree or more is performed, that is, when rapid acceleration operation is performed as shown by the solid line arrows in FIG. 22, control is performed different from the above-mentioned time of slow acceleration operation. That is, if the engine load is rapidly raised and a rapid acceleration operation is performed, the amount of $NO_X$ which is produced in the combustion chambers 2 rapidly increases. Therefore, at this time, to reduce the amount of $NO_X$ which is exhausted from the combustion chambers 2, it is necessary to rapidly increase the amount of recirculated exhaust gas. However, at this time, if using the low pressure exhaust gas recirculation system LPL for a recirculation action, even if increasing the opening degree of the EGR control valve 24 so as to rapidly increase the amount of recirculated exhaust gas, since the volume of the passage from the exhaust pipe 14 to the combustion chambers 2 is large, the amount of recirculated exhaust gas which is fed to the inside of the combustion chambers 2 cannot be rapidly increased. Therefore, if the exhaust gas is recirculated by the low pressure exhaust gas recirculation system LPL at the time of a rapid acceleration operation, the problem arises of a large amount of $NO_X$ being exhausted when the rapid acceleration operation is performed.

As opposed to this, with the high pressure exhaust gas recirculation system HPL, the volume of the passage from the exhaust manifold 5 to the combustion chambers 2 is small, so if increasing the opening degree of the EGR control valve 24, the amount of recirculated exhaust gas which is fed to the inside of the combustion chambers 2 immediately increases. Therefore, in the present invention, if a rapid acceleration operation is performed when the exhaust gas is recirculated by the low pressure exhaust gas recirculation system LPL, the recirculation action of the exhaust gas by the low pressure exhaust gas recirculation system LPL is immediately switched to the recirculation action of exhaust gas by the high pressure exhaust gas recirculation system HPL. On the other hand, if a rapid acceleration operation is performed and the engine load becomes high, the amount of exhaust of $NO_X$ from the combustion chambers 2 increases. Further, at this time, if the recirculation action of the exhaust gas by the low pressure exhaust gas recirculation system LPL is switched to the recirculation action of exhaust gas by the high pressure exhaust gas recirculation system HPL, the amount of exhaust of $NO_X$ from the combustion chambers 2 further increases. Therefore, at this time, to remove the $NO_X$ well, the $NO_X$ purification action by the second $NO_X$ purification method is immediately switched to the $NO_X$ purification action by the first $NO_X$ purification method.

Therefore, according to the present invention, in an exhaust purification system of an internal combustion engine, the exhaust turbocharger which has the compressor 7a and the exhaust turbine 7b is provided, the exhaust purification catalyst 13 is arranged in the engine exhaust passage downstream of the exhaust turbine 7b, the hydrocarbon feed valve 15 is arranged in the engine exhaust passage upstream of the exhaust purification catalyst 13, the precious metal catalysts 51, 52 are carried on exhaust gas flow surfaces of the exhaust purification catalyst 13, the basic exhaust gas flow surface parts 54 are formed around the precious metal catalysts 51, 52, the exhaust purification catalyst 13 has the property of reducing the $NO_X$ which is contained in the exhaust gas if making the concentration of hydrocarbons which flow into the exhaust purification catalyst 13 vibrate by within a predetermined range of amplitude and by within a predetermined range of period and has the property of being increased in storage amount of the $NO_X$ which is contained in the exhaust gas if making a vibration period of the hydrocarbon concentration longer than the predetermined range, a first $NO_X$ purification method which makes the concentration of hydrocarbons which flow into the exhaust purification catalyst 13 vibrate by within predetermined ranges of amplitude and period so as to remove the $NO_X$ and a second $NO_X$ purification method which makes the vibration period of the hydrocarbon concentration longer than the predetermined range so as to store the $NO_X$ in the exhaust purification catalyst 13 and makes the air-fuel ratio of the exhaust gas rich so as to release the stored $NO_X$ can be selectively used, wherein a high pressure exhaust gas recirculation system HPL which recirculates a relatively high pressure exhaust gas in the engine exhaust passage upstream of the exhaust turbine 7b to the inside of the intake passage downstream of the compressor 7a and a low pressure exhaust gas recirculation system LPL which recirculates a relatively low pressure exhaust gas in the engine exhaust passage downstream of the exhaust purification catalyst 13 to the inside of the intake passage upstream of the compressor, and wherein if an acceleration operation with a degree of acceleration of a predetermined degree or more is performed when the $NO_X$ purification action by the second $NO_X$ purification method is being performed while performing the exhaust gas recirculation action by the low pressure exhaust gas recirculation system LPL, the $NO_X$ purification action is switched to the $NO_X$ purification action by the first $NO_X$ purification method and the exhaust gas recirculation action is temporarily switched to the exhaust gas recirculation action by the high pressure exhaust gas recirculation system HPL.

Note that, in this case, when the degree of acceleration at the time of an acceleration operation is less than the predetermined degree, that is, at the time of the slow acceleration operation, the exhaust gas recirculation action is maintained at the exhaust gas recirculation action by the low pressure exhaust gas recirculation system LPL.

Figure 23:
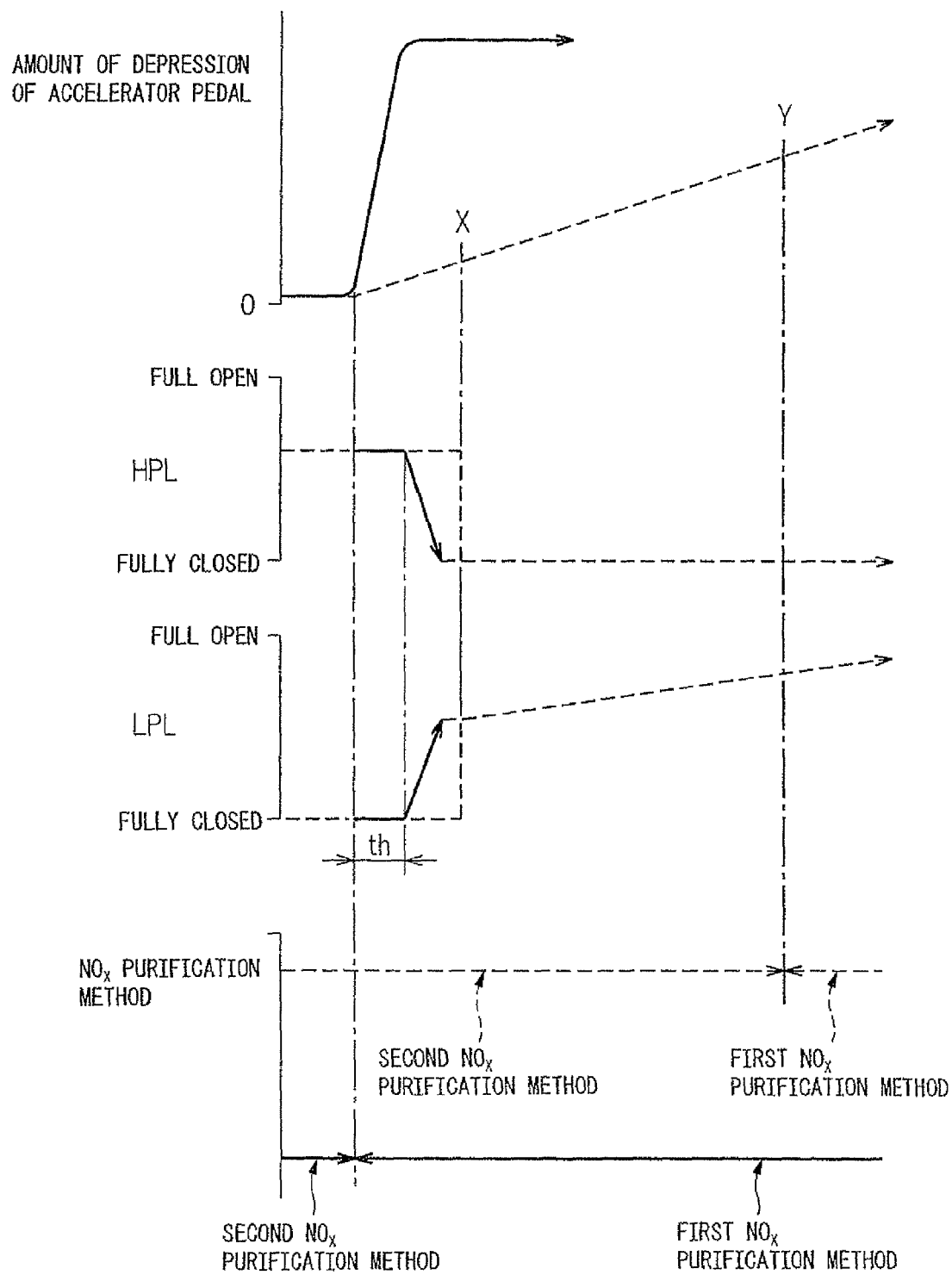
[FIG. 23]

FIG. 23 shows the change in the amount of depression of the accelerator pedal 40, the change in the opening degree of the EGR control valve 17 of the high pressure exhaust gas recirculation system HPL, the change in the opening degree of the EGR control valve 24 of the low pressure exhaust gas recirculation system LPL, and the $NO_X$ purification method in the case where an acceleration operation is performed when the operating state of the engine is at the point a of the operating region I in FIG. 22. Note that the broken lines in FIG. 23 show the time when the degree of acceleration is less than a predetermined degree as shown by the broken line arrows in FIG. 22, that is, when the slow acceleration operation is performed, while the solid lines in FIG. 23 show the time when the degree of acceleration is a predetermined degree or more as shown by the solid line arrows in FIG. 22, that is, when the rapid acceleration operation is performed.

When the operating state of the engine is the operating region I, as explained above, the $NO_X$ purification action by the second $NO_X$ purification method is being performed while performing the exhaust gas recirculation action by the high pressure exhaust gas recirculation system HPL. At this time, as will be understood from FIG. 23, the EGR control valve 24 of the low pressure exhaust gas recirculation system LPL is made to completely close and the opening degree of the EGR control valve 17 of the high pressure exhaust gas recirculation system HPL is made the opening degree which is determined from the operating state of the engine. Next, as shown by the broken line arrows, if the accelerator pedal 40 is slowly depressed, that is, the slow acceleration operation is performed, when the operating state of the engine crosses the boundary X which is shown in FIG. 22, as shown by the broken line arrows, the $NO_X$ purification action by the second $NO_X$ purification method is maintained while the exhaust gas recirculation action is switched from the exhaust gas recirculation action by the high pressure exhaust gas recirculation system HPL to the exhaust gas recirculation action by the low pressure exhaust gas recirculation system LPL. Next, if the operating state of the engine crosses the boundary Y which is shown in FIG. 22, the exhaust gas recirculation action by the low pressure exhaust gas recirculation system LPL is maintained while the $NO_X$ purification action is switched from the $NO_X$ purification action by the second $NO_X$ purification method to the $NO_X$ purification action by the first $NO_X$ purification method.

As opposed to this, when the operating state of the engine is the operating region I, as shown by the solid line arrows in FIG. 23, if the accelerator pedal 40 is rapidly depressed, that is, the rapid acceleration operation is performed, the $NO_X$ purification action is immediately switched from the $NO_X$ purification action by the second $NO_X$ purification method to the $NO_X$ purification action by the first $NO_X$ purification method. On the other hand, at this time, the exhaust gas recirculation action is maintained at the exhaust gas recirculation action by the high pressure exhaust gas recirculation system HPL as is for the predetermined time th. When this predetermined time th elapses, the exhaust gas recirculation action is gradually switched to an exhaust gas recirculation action by the low pressure exhaust gas recirculation system LPL.

That is, if an acceleration operation with a degree of acceleration of a predetermined degree or more is performed when the $NO_X$ purification action by the second $NO_X$ purification method is being performed while performing the exhaust gas recirculation action by the high pressure exhaust gas recirculation system HPL, the $NO_X$ purification action is switched to the $NO_X$ purification action by the first $NO_X$ purification method and the exhaust gas recirculation action is maintained as exhaust gas recirculation action by the high pressure exhaust gas recirculation system HPL for a predetermined time, then is gradually switched to exhaust gas recirculation action by the low pressure exhaust gas recirculation system LPL. Note that, as shown by the solid line arrows in FIG. 23, the processing from when the acceleration operation is started to when the exhaust gas recirculation action by the high pressure exhaust gas recirculation system HPL is stopped and the exhaust gas recirculation action by only the low pressure exhaust gas recirculation system LPL is started is called the "acceleration start processing".

Figure 24:
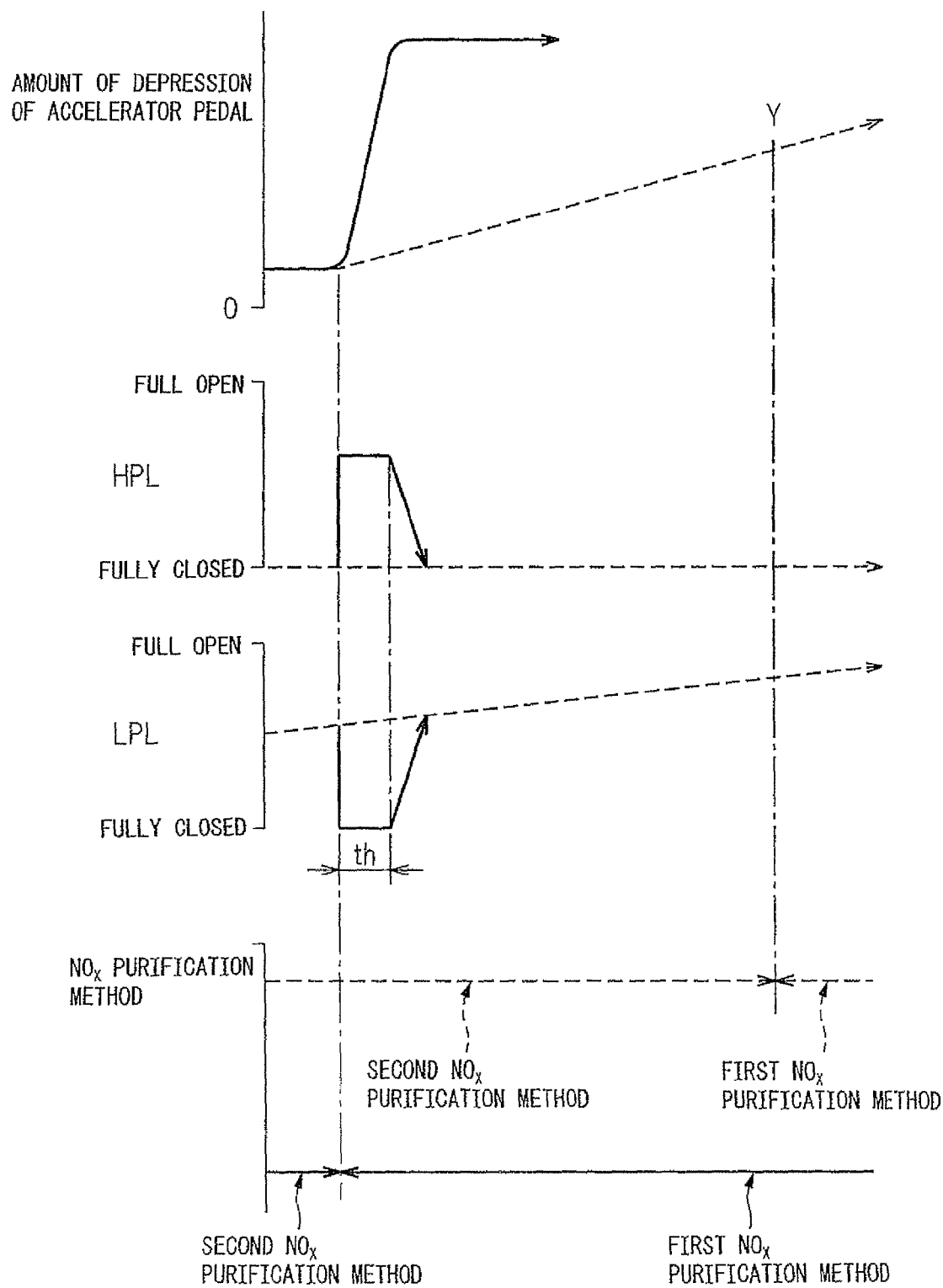
[FIG. 24]

FIG. 24 shows the change in the amount of depression of the accelerator pedal 40, the change in the opening degree of the EGR control valve 17 of the high pressure exhaust gas recirculation system HPL, the change in the opening degree of the EGR control valve 24 of the low pressure exhaust gas recirculation system LPL, and the $NO_X$ purification method in the case where an acceleration operation is performed when the operating state of the engine is at the point b of the operating region II in FIG. 22. Note that, in the same way as FIG. 23, the broken lines in FIG. 24 show the time when the degree of acceleration is less then a predetermined degree as shown by the broken line arrows in FIG. 22, that is, when the slow acceleration operation is performed, while the solid lines in FIG. 24 show the time when the degree of acceleration is a predetermined degree or more as shown by the solid line arrows in FIG. 22, that is, when the rapid acceleration operation is performed.

When the operating state of the engine is the operating region II, as explained above, the $NO_X$ purification action by the second $NO_X$ purification method is performed while performing the exhaust gas recirculation action by the low pressure exhaust gas recirculation system LPL. At this time, as will be understood from FIG. 24, the EGR control valve 17 of the high pressure exhaust gas recirculation system HPL is made to fully close and the opening degree of the EGR control valve 24 of the low pressure exhaust gas recirculation system LPL is made the opening degree which is determined from the operating state of the engine. Next, as shown by the broken line arrows, if the accelerator pedal 40 is slowly depressed, that is, if the slow acceleration operation is performed, when the operating state of the engine crosses the boundary Y which is shown in FIG. 22, the exhaust gas recirculation action by the low pressure exhaust gas recirculation system LPL is maintained while the $NO_X$ purification action is switched from the $NO_X$ purification action by the second $NO_X$ purification method to the $NO_X$ purification action by the first $NO_X$ purification method.

As opposed to this, when the operating state of the engine is the operating region II, if, as shown by the solid line arrows in FIG. 24, the accelerator pedal 40 is rapidly depressed, that is, the rapid acceleration operation is performed, the $NO_X$ purification action is immediately switched from the $NO_X$ purification action by the second $NO_X$ purification method to the $NO_X$ purification action by the first $NO_X$ purification method. On the other hand, at this time, the exhaust gas recirculation action is immediately switched from the exhaust gas recirculation action by the low pressure exhaust gas recirculation system LPL to the exhaust gas recirculation action by the high pressure exhaust gas recirculation system HPL, and then the exhaust gas recirculation action by the high pressure exhaust gas recirculation system HPL is maintained for the predetermined time th. Next, when this predetermined time th elapses, the exhaust gas recirculation action is gradually switched to exhaust gas recirculation action by the low pressure exhaust gas recirculation system LPL. Note that, in this case, the processing from when, as shown by the solid line arrows in FIG. 24, the exhaust gas recirculation action by the low pressure exhaust gas recirculation system LPL is switched to the exhaust gas recirculation action by the high pressure exhaust gas recirculation system HPL to when the exhaust gas recirculation action by the high pressure exhaust gas recirculation system HPL is again stopped and the exhaust gas recirculation action by just the low pressure exhaust gas recirculation system LPL is started is called the "acceleration start processing".

That is, as explained above, if an acceleration operation with a degree of acceleration of a predetermined degree or more is performed when while the $NO_X$ purification action by the second $NO_X$ purification method is being performed while performing the exhaust gas recirculation action by the low pressure exhaust gas recirculation system LPL, the $NO_X$ purification action is switched to the $NO_X$ purification action by the first $NO_X$ purification method and the exhaust gas recirculation action is temporarily switched to the exhaust gas recirculation action by the high pressure exhaust gas recirculation system HPL.

Figure 25:
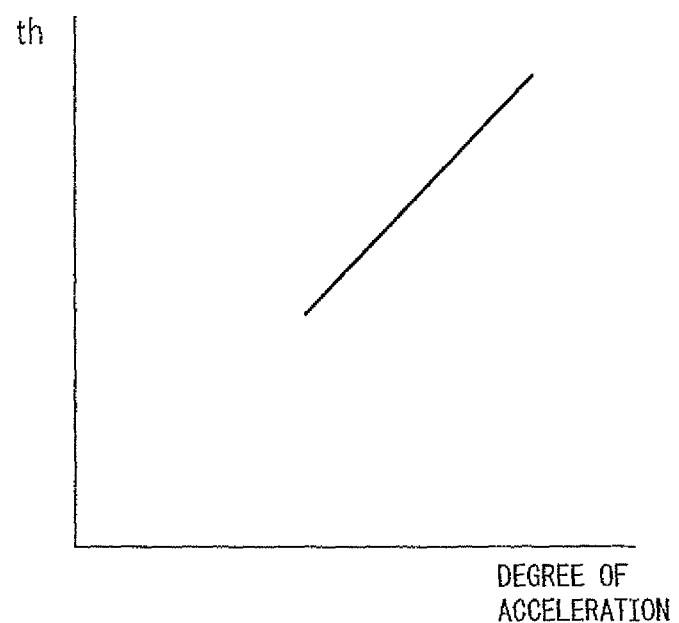
[FIG. 25]

The predetermined time th in FIG. 24, that is, the time th where the exhaust gas recirculation action is temporarily switched to the exhaust gas recirculation action by the high pressure exhaust gas recirculation system HPL, is a time until a sufficient amount of exhaust gas can be recirculated to the inside of the combustion chambers 2 even if switching the exhaust gas recirculation action to an exhaust gas recirculation action by the low pressure exhaust gas recirculation system LPL. This time th, as shown in FIG. 25, becomes longer the higher the degree of acceleration. The same is true for the case which is shown in FIG. 23 as well. After a rapid acceleration operation is started, the time th at which the exhaust gas recirculation action by the high pressure exhaust gas recirculation system HPL is maintained, as shown in FIG. 25, becomes longer the higher the degree of acceleration.

Figure 26:
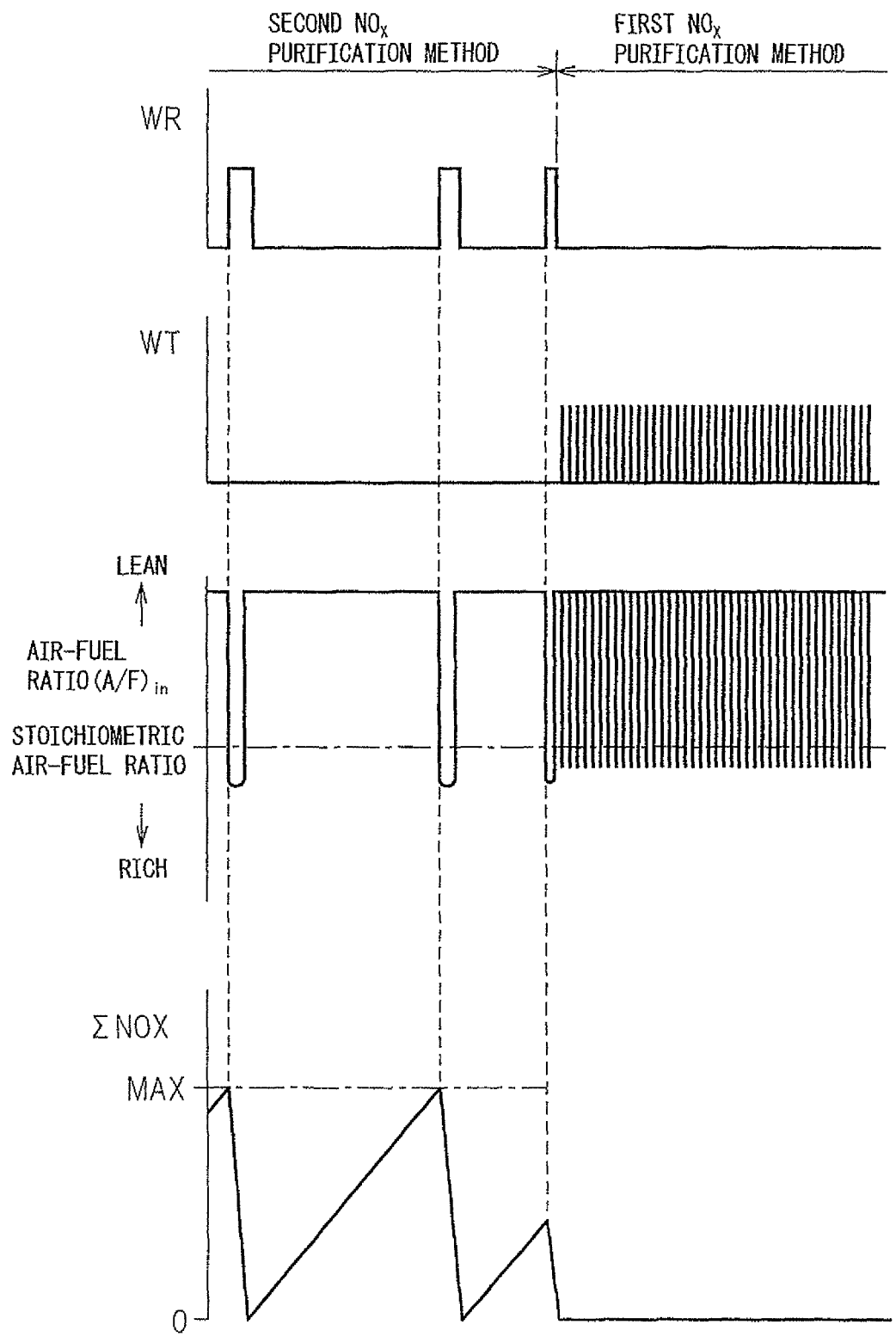
[FIG. 26]

FIG. 26 shows the changes in the injection timing of additional fuel WR, the feed timing of hydrocarbons WT, the air-fuel ratio (A/F) in of the exhaust gas which flows into the exhaust purification catalyst 13, and the stored $NO_X$ amount ΣNOX which is stored in the exhaust purification catalyst 13 when the $NO_X$ purification action by the second $NO_X$ purification method is switched to the $NO_X$ purification action by the first $NO_X$ purification method. If, in the state where the exhaust purification catalyst 13 stores $NO_X$, the $NO_X$ purification action by the second $NO_X$ purification method is switched to the $NO_X$ purification action by the first $NO_X$ purification method, when the $NO_X$ purification action by the first $NO_X$ purification method is started, the $NO_X$ which is stored in the exhaust purification catalyst 13 is released without being reduced. Therefore, in this embodiment according to the present invention, when the $NO_X$ purification action by the second $NO_X$ purification method is switched to the $NO_X$ purification action by the first $NO_X$ purification method, if the exhaust purification catalyst 13 stores $NO_X$, as shown in FIG. 26, additional fuel WR is fed and the air-fuel ratio (A/F)in of the exhaust gas which flows in the exhaust purification catalyst 13 is temporarily made rich to release and reduce the stored $NO_X$.

Figure 27:
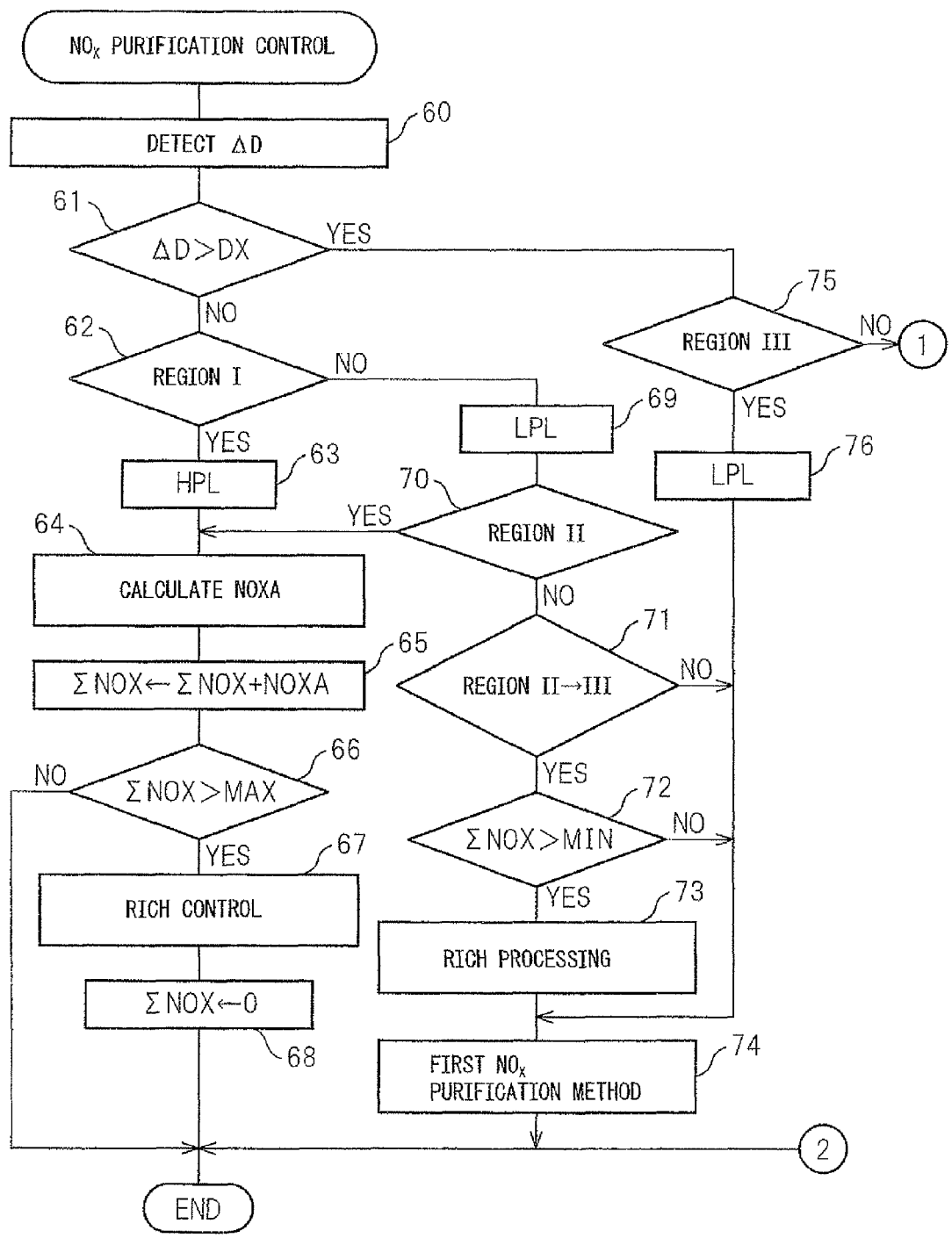
[FIG. 27]
Figure 28:
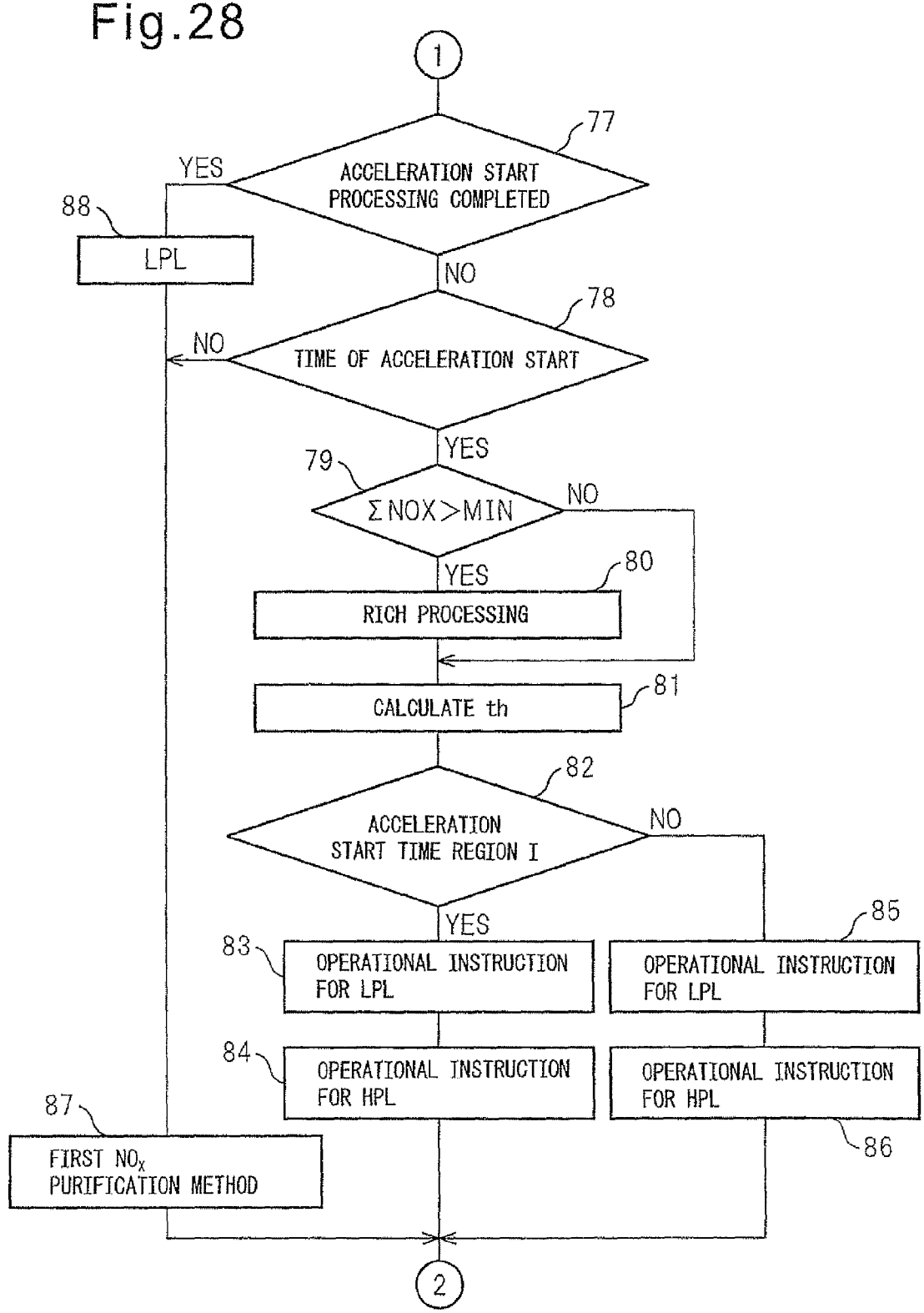
[FIG. 28]

FIG. 27 and FIG. 28 show an $NO_X$ purification control routine. This routine is executed by interruption every certain time period.

Referring to FIG. 27, first, at step 60, the degree of acceleration $\Delta D$ at the time of the acceleration operation is detected. This degree of acceleration $\Delta D$ is, for example, calculated based on the change per unit time of the amount of depression of the accelerator pedal 40. Next, at step 61, it is judged if the degree of acceleration $\Delta D$ is larger than a predetermined degree DX, that is, if the time is the time of rapid acceleration operation. When the degree of acceleration $\Delta D$ is smaller than a predetermined degree DX, that is, at the time of the slow acceleration operation, the routine proceeds to step 62 where it is judged if the operating state of the engine is the operating region I which is shown in FIG. 22. When the operating state of the engine is the operating region I, the routine proceeds to step 63 where the exhaust gas recirculation action by the high pressure exhaust gas recirculation system HPL is performed. Next the routine proceeds to step 64 where the $NO_X$ purification action by the second $NO_X$ purification method is performed.

That is, at step 64, from the map which is shown in FIG. 17, the $NO_X$ amount NOXA which is exhausted per unit time is calculated. Next, at step 65, the exhausted $NO_X$ amount NOXA is added to $\Sigma$NOX whereby the stored $NO_X$ amount $\Sigma$NOX is calculated. Next, at step 66, it is judged if the stored $NO_X$ amount $\Sigma$NOX exceeds the allowable value MAX. When $\Sigma$NOX>MAX, the routine proceeds to step 67 where the additional fuel amount WR is calculated from the map which is shown in FIG. 21 and an injection action of additional fuel is performed. Next, at step 68, $\Sigma$NOX is cleared.

On the other hand, when it is judged at step 62 that the operating state of the engine is not the operating region I, the routine proceeds to step 69 where the exhaust gas recirculation action by the low pressure exhaust gas recirculation system LPL is performed. Next at step 70, it is judged if the operating state of the engine is the operating region II which is shown in FIG. 22. When the operating state of the engine is the operating region II, the routine proceeds to step 64 where the $NO_X$ purification action by the second $NO_X$ purification method is performed. As opposed to this, when the operating state of the engine is not the operating region II, that is, when the operating state of the engine is the operating region III which is shown in FIG. 22, the routine proceeds to step 71 where it is judged if the operating state of the engine has now changed from the operating region II to the operating region III. When the operating state of the engine is now not changed from the operating region II to the operating region III, that is, when the operating state of the engine continues in the operating region III, the routine jumps to step 74 where the $NO_X$ purification action by the first $NO_X$ purification method is performed. That is, the injection time WT corresponding to the operating state is calculated from the map which is shown in FIG. 17A, the injection period $\Delta T$ corresponding to the operating state is calculated from the map which is shown in FIG. 17B, and these calculated injection time WT and injection period $\Delta T$ are used for injection of hydrocarbons from the hydrocarbon feed valve 15.

On the other hand, when it is judged at step 71 that the operating state of the engine has now changed from the operating region II to the operating region III, the routine proceeds to step 72 where it is judged if the stored $NO_X$ amount $\Sigma$NOX is larger than a certain value MIN. Note that, this certain value MIN is made a considerably smaller value than the allowable value MAX. When it is judged at step 72 that the stored $NO_X$ amount $\Sigma$NOX is smaller than the certain value MIN, the routine jumps to step 74 where the $NO_X$ purification action by the first $NO_X$ purification method is performed. As opposed to this, when it is judged that the stored $NO_X$ amount $\Sigma$NOX is larger than the certain value MIN, the routine proceeds to step 73 where, to release and reduce the stored $NO_X$, as shown in FIG. 26, additional fuel WR is fed, the air-fuel ratio (A/F)in of the exhaust gas which flows into the exhaust purification catalyst 13 is temporarily made rich, and $\Sigma$NOX is cleared. Next the routine proceeds to step 74 where the $NO_X$ purification action by the first $NO_X$ purification method is started.

On the other hand, when it is judged at step 61 that the degree of acceleration $\Delta D$ is larger than the predetermined degree DX, that is, at the time of the rapid acceleration operation, the routine proceeds to step 75 where it is judged if the operating state of the engine is the operating region III. When the operating state of the engine is the operating region III, the routine proceeds to step 76 where the exhaust gas recirculation action by the low pressure exhaust gas recirculation system LPL is performed, next the routine proceeds to step 74 where the $NO_X$ purification action by the first $NO_X$ purification method is performed. That is, if the rapid acceleration operation is performed when the operating state of the engine is the operating region III, the $NO_X$ purification action by the first $NO_X$ purification method continues to be performed while performing the exhaust gas recirculation action by the low pressure exhaust gas recirculation system LPL.

As opposed to this, when it is judged at step 75 that the operating state of the engine is not the operating region III, that is, when the rapid acceleration operation is performed is a state where the operating state of the engine is the operating region I or II, the routine proceeds to step 77 of FIG. 28 where it is judged if the above-mentioned acceleration start processing has been completed. When the acceleration start processing has not been completed, the routine proceeds to step 78 where it is judged if it is the time of acceleration start. When it is the time of acceleration start, the routine proceeds to step 79 where it is judged if the stored $NO_X$ amount $\Sigma$NOX is greater than the certain value MIN. When it is judged that the stored $NO_X$ amount $\Sigma$NOX is smaller than the certain value MIN, the routine jumps to step 81. As opposed to this, when the stored $NO_X$ amount $\Sigma$NOX is larger than the certain value MIN, the routine proceeds to step 80 where, to make the stored $NO_X$ be released and reduced, as shown in FIG. 26, additional fuel WR is fed, the air-fuel ratio (A/F)in of the exhaust gas which flows into the exhaust purification catalyst 13 is temporarily made rich, and $\Sigma$NOX is cleared. Next the routine proceeds to step 81.

At step 81, the degree of acceleration $\Delta D$ is used as the basis to calculate the time th from the relationship which is shown in FIG. 25. Next at step 82, it is judged if the operating state of the engine at the time of acceleration start was the operating region I. When the operating state of the engine at the time of acceleration start was the operating region I, the routine proceeds to step 83 where an EGR control valve operation instruction is issued so as to change the opening degree of the EGR control valve 24 of the low pressure exhaust gas recirculation system LPL as shown by the solid line arrow of FIG. 23. Next the routine proceeds to step 84 where an EGR control valve operation instruction is issued so as to change the opening degree of the EGR control valve 17 of the high pressure exhaust gas recirculation system HPL as shown by the solid line arrow of FIG. 23. That is, instructions are issued so as to perform acceleration start processing which changes the opening degree of the EGR control valve 24 of the low pressure exhaust gas recirculation system LPL and the opening degree of the EGR control valve 17 of the high pressure exhaust gas recirculation system HPL as shown by the solid line arrows of FIG. 23.

On the other hand, when it is judged at step 82 that the operating state of the engine at the time of acceleration start was the operating region II, the routine proceeds to step 85 where an EGR control valve operation instruction is issued so as to change the opening degree of the EGR control valve 24 of the low pressure exhaust gas recirculation system LPL as shown by the solid line arrows in FIG. 24. Next, the routine proceeds to step 86 where an EGR control valve operation instruction is issued so as to change the opening degree of the EGR control valve 17 of the high pressure exhaust gas recirculation system HPL as shown by the solid line arrows in FIG. 24. That is, instructions are issued for acceleration start processing which changes the opening degree of the EGR control valve 24 of the low pressure exhaust gas recirculation system LPL and the opening degree of the EGR control valve 17 of the high pressure exhaust gas recirculation system HPL as shown by the solid line arrows of FIG. 24.

On the other hand, when it is judged at step 75 that it is not the time of start of acceleration, that is, when it is judged that the acceleration operation is underway, the routine proceeds to step 87 where the $NO_X$ purification action by the first $NO_X$ purification method is performed. That is, when the acceleration operation is started, if the stored $NO_X$ amount $\Sigma NOX$ is greater than the certain value MIN, the air-fuel ratio (A/F)in of the exhaust gas which flows into the exhaust purification catalyst 13 is temporarily made rich so as to make the $NO_X$ which is stored in the exhaust purification catalyst 13 be released and reduced, then the $NO_X$ purification action by the second $NO_X$ purification method is switched to the $NO_X$ purification action by the first $NO_X$ purification method. Next when it is judged at step 77 that the operational instructions which were issued at step 83 and 84 or step 85 and 86 have been completed, that is, when the acceleration start processing has been completed, the routine proceeds to step 88 where the exhaust gas recirculation action by the low pressure exhaust gas recirculation system LPL is performed. Next the routine0 proceeds to step 87.

Note that, as another embodiment, it is also possible to arrange an oxidation catalyst for reforming the hydrocarbons inside of the engine exhaust passage upstream of the exhaust purification catalyst 13.

REFERENCE SIGNS LIST

4. intake manifold
5. exhaust manifold
7. exhaust turbocharger
12. exhaust pipe
13. exhaust purification catalyst
15. hydrocarbon feed valve
HPL. high pressure exhaust gas recirculation system
LPL. low pressure exhaust gas recirculation system

The invention claimed is:

1. An exhaust purification system of an internal combustion engine comprising:
   an exhaust turbocharger having a compressor and an exhaust turbine,
   an exhaust purification catalyst arranged in an engine exhaust passage downstream of the exhaust turbine,
   a hydrocarbon feed valve arranged in the engine exhaust passage upstream of the exhaust purification catalyst,
   precious metal catalysts carried on exhaust gas flow surfaces of the exhaust purification catalyst;
   basic exhaust gas flow surface parts formed around the precious metal catalysts,
   wherein the exhaust purification catalyst has a property of reducing NOx contained in an exhaust gas if making a concentration of hydrocarbons which flow into the exhaust purification catalyst vibrate by within a predetermined range of amplitude and by within a predetermined range of period and has a property of being increased in storage amount of NOx which is contained in the exhaust gas if making a vibration period of the hydrocarbon concentration longer than the predetermined range,
   an electronic control unit configured to perform a first NOx purification logic which makes the concentration of hydrocarbons which flow into the exhaust purification catalyst vibrate by within the predetermined ranges of amplitude and period so as to remove the NOx and a second NOx purification logic which makes the vibration period of the hydrocarbon concentration longer than the predetermined range so as to store the NOx in the exhaust purification catalyst and makes an air-fuel ratio of the exhaust gas rich so as to release the stored NOx can be selectively used,
   wherein a high pressure exhaust gas recirculation system which recirculates a relatively high pressure exhaust gas in the engine exhaust passage upstream of the exhaust turbine to an inside of the intake passage downstream of the compressor and a low pressure exhaust gas recirculation system which recirculates a relatively low pressure exhaust gas in the engine exhaust passage downstream of the exhaust purification catalyst to an inside of the intake passage upstream of the compressor are provided, and
   wherein if an acceleration operation is performed with a degree of acceleration of a predetermined degree or more when an NOx purification action by the second NOx purification logic is being performed while performing an exhaust gas recirculation action by the low pressure exhaust gas recirculation system, the NOx purification action is switched to the NOx purification action by the first NOx purification logic and the exhaust gas recirculation action is temporarily switched to the exhaust gas recirculation action by the high pressure exhaust gas recirculation system.

2. An exhaust purification system of an internal combustion engine as claimed in claim 1, wherein when the degree of acceleration at the time of the acceleration operation is less than the predetermined degree, the exhaust gas recirculation action is maintained as the exhaust gas recirculation action by the low pressure exhaust gas recirculation system.

3. An exhaust purification system of an internal combustion engine as claimed in claim 1, wherein a time period when the exhaust gas recirculation action is temporarily switched to the exhaust gas recirculation action by the high pressure exhaust gas recirculation system is made longer the higher the degree of acceleration.

4. An exhaust purification system of an internal combustion engine as claimed in claim 1, wherein if an acceleration operation is performed with a degree of acceleration of the predetermined degree or more when the NOx purification action by the second NOx purification logic, is being performed while performing an exhaust gas recirculation action by the high pressure exhaust gas recirculation system, the exhaust gas recirculation action is maintained for a predetermined time as the exhaust gas recirculation action by the high pressure exhaust gas recirculation system, then is switched to the exhaust gas recirculation action by the low pressure exhaust gas recirculation system.

5. An exhaust purification system of an internal combustion engine as claimed in claim 1, wherein at the engine low speed, low load side, the NOx purification action by the second NOx purification logic is performed, while at the engine high speed, high load side, the NOx purification action by the first NOx purification logic is performed.

6. An exhaust purification system of an internal combustion engine as claimed in claim 1, wherein when the NOx purification action is being performed by the first NOx purification logic while performing an exhaust gas recirculation action by the low pressure exhaust gas recirculation system, compared with when the NOx purification action is being performed by the first NOx purification logic while performing an exhaust gas recirculation action by the high pressure exhaust gas recirculation system under the same engine operating conditions, the amplitude of the hydrocarbon concentration is made larger mad the vibration period of the hydrocarbon concentration is made longer.

\* \* \* \* \*